(12) United States Patent
Rinaldi

(10) Patent No.: US 8,316,757 B2
(45) Date of Patent: Nov. 27, 2012

(54) HYDRAULIC CONTROL VALVE ASSEMBLY WITH MONOLITHIC BODY AND SINGLE SPOOL PORT LOCK

(75) Inventor: Massimo Rinaldi, Tulsa, OK (US)

(73) Assignee: Walvoil Fluid Power Corp., Tulsa, OK (US)

( * ) Notice: Subject to any disclaimer, the term of this patent is extended or adjusted under 35 U.S.C. 154(b) by 356 days.

(21) Appl. No.: 12/631,540

(22) Filed: Dec. 4, 2009

(65) Prior Publication Data

US 2011/0132473 A1 Jun. 9, 2011

(51) Int. Cl.
*F15B 13/043* (2006.01)

(52) U.S. Cl. ................... 91/445; 137/625.64

(58) Field of Classification Search .............. 91/445; 137/625.64, 884, 625.69
See application file for complete search history.

(56) References Cited

U.S. PATENT DOCUMENTS

| | | | | |
|---|---|---|---|---|
| 2,922,400 | A | * | 1/1960 | Lorence ............... 91/372 |
| 3,127,688 | A | * | 4/1964 | Hein et al. ............ 37/414 |
| 3,566,749 | A | * | 3/1971 | Allen et al. ........... 91/445 |
| 5,577,876 | A | | 11/1996 | Haeder et al. |
| 6,408,876 | B1 | * | 6/2002 | Nishimura et al. .... 137/596.15 |
| 6,505,645 | B1 | | 1/2003 | Pack et al. |
| 6,964,281 | B2 | * | 11/2005 | Pieper ................ 137/596.12 |
| 7,270,046 | B2 | * | 9/2007 | Stephenson et al. ...... 91/454 |
| 2006/0081297 | A1 | * | 4/2006 | Miyazoe et al. ........ 137/625.42 |

* cited by examiner

*Primary Examiner* — John Rivell
*Assistant Examiner* — R. K. Arundale
(74) *Attorney, Agent, or Firm* — Young & Thompson

(57) ABSTRACT

A hydraulic control valve with a monolithic body having four sides located between a top and a bottom, and all pilot ports on a body front side, valve work ports on the top side, three bores running within the body from the front side to a rear side, a spool in each bore, and a single three section spool port lock that locks two or three ports at the same time, the pilot ports present machined female quick-connect connections, with spring wet cavities being provided for mechanically operated control spools.

13 Claims, 22 Drawing Sheets

HYDRAULIC CONTROL VALVE ASSEMBLY WITH MONOLITHIC BODY AND SINGLE SPOOL PORT LOCK

BACKGROUND OF THE INVENTION

The present invention relates to a hydraulic control valve assembly for hydraulic fluid control of power equipment such as a skid steer loader.

More particularly, the present invention relates to a hydraulic control valve assembly with embodiments including a monolithic valve body and a single spool port lock that locks two or three ports at the same time. In the present invention, pilot ports and mechanically operated control spools are positioned in a common face that obviates the need for elbows in control lines at the point where the control lines connect to the valve body, with spring wet cavities being provided for the mechanically operated control spools.

DESCRIPTION OF THE RELATED ART

Hydraulically operated equipment, such as skid loaders, require a hydraulic control valve to translate an operator's control directions into pressurized hydraulic fluid movements used to actuate and manipulate the hydraulic cylinder-piston arrangements of hydraulic power elements, e.g., a lift arm and tools such as a lift bucket.

The operator uses a control mechanism, e.g., a control joystick or a pilot control, to control the various hydraulic power elements. The control linkage from the control mechanism to the hydraulic control valve and acting on the control spools of the hydraulic control valve may be electro-hydraulic control involving a solenoid valve, pilot operated hydraulic control via pressurized hydraulic lines, and mechanical linkages.

Such hydraulic control valves have been complicated, involving the assembly of multiple elements and valve body parts, the final assembly and maintenance being performed within the close quarters of the hydraulically operated equipment itself.

As such, the hydraulic control valves have been complicated to install and maintain, the hydraulic lines extending from the operator's control mechanism to the control valve needing 90 degree elbows at an installation point of the hydraulic control valve. Where mechanical linkages are used between the operator's control mechanism and the hydraulic control valve, the linkage arrangement may be complex to install and maintain. For hydraulic lines, male couplings are provided on both ends of the line. In the prior art, a female-counterpart coupling was required within the pilot port, typically a 90 degree coupling.

The prior art port control schemes have been complex schemes, some of which require a plurality of lockout valves.

SUMMARY OF THE INVENTION

The present invention provides improves over the prior art in that the embodiments of the invention provide a hydraulic control valve assembly that overcomes problems applicant has identified in the prior hydraulic control valve assemblies.

The present invention includes a monolithic valve body embodiment.

The present invention provides that the monolithic valve body is installable in either a vertical or horizontal orientation that obviates the need for elbows at the point where control lines extending from an operator's control mechanism connect to the valve body.

The present invention includes an embodiment with a monolithic valve body that reduces installation and maintenance difficulties by providing machined female surfaces mating the hydraulic control lines extending from an operator's control mechanism.

The present invention includes an embodiment with a monolithic valve body that reduces installation and maintenance difficulties by providing pilot ports and mechanically operated control spools positioned in a common face oriented to obviate the need for elbows at the point where the control lines connect to the valve body. Additionally, in embodiments requiring electrical wiring, the wiring for the port lock valve spool and the control spools are advantageously kept on the same side of the valve body.

The present invention includes an embodiment with a single spool port lock that locks two or three ports at the same time, in single or plural stages.

The present invention includes an embodiment with a monolithic valve body with a single spool port lock that locks two or three ports at the same time, in single or plural stages. This monolithic valve body and single spool port lock provides lower pressure drops by allowing larger passages, which increases machine efficiency. Additionally, with the same port lock bore, differently shaped port lock spools are selectable to achieve different operational results such as using an ON-OFF spool or a proportional spool changes the port lock valve's functionality.

The port lock spool may comprise notches to improve the smoothness of motion when shifting from closed to open position and vice versa.

The present invention includes an embodiment with mechanically operated control spools having integrated elements for attachment to the control linkage from the operator's control mechanism, the end piece being either integrated with or coupled to the main portion of the control spool.

The present invention includes an embodiment with mechanically operated control spools having integrated elements for attachment to the control linkage from the operator's control mechanism, with a spring wet cavity.

DESCRIPTION OF THE PREFERRED EMBODIMENTS

Figure 1:
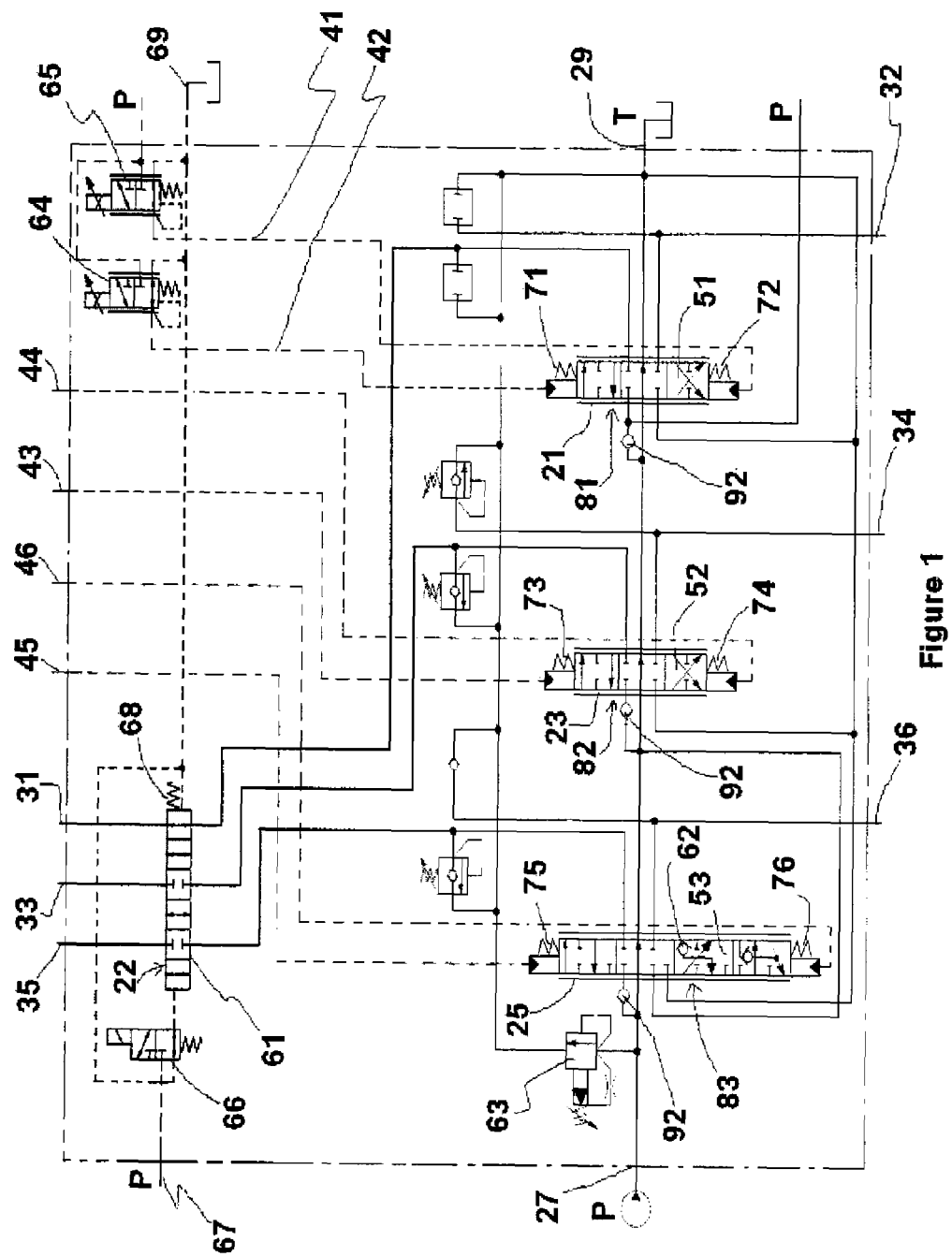
FIG. 1 is a schematic representation of the inventive hydraulic control valve with a monolithic body and a single spool port lock.
Figure 2:
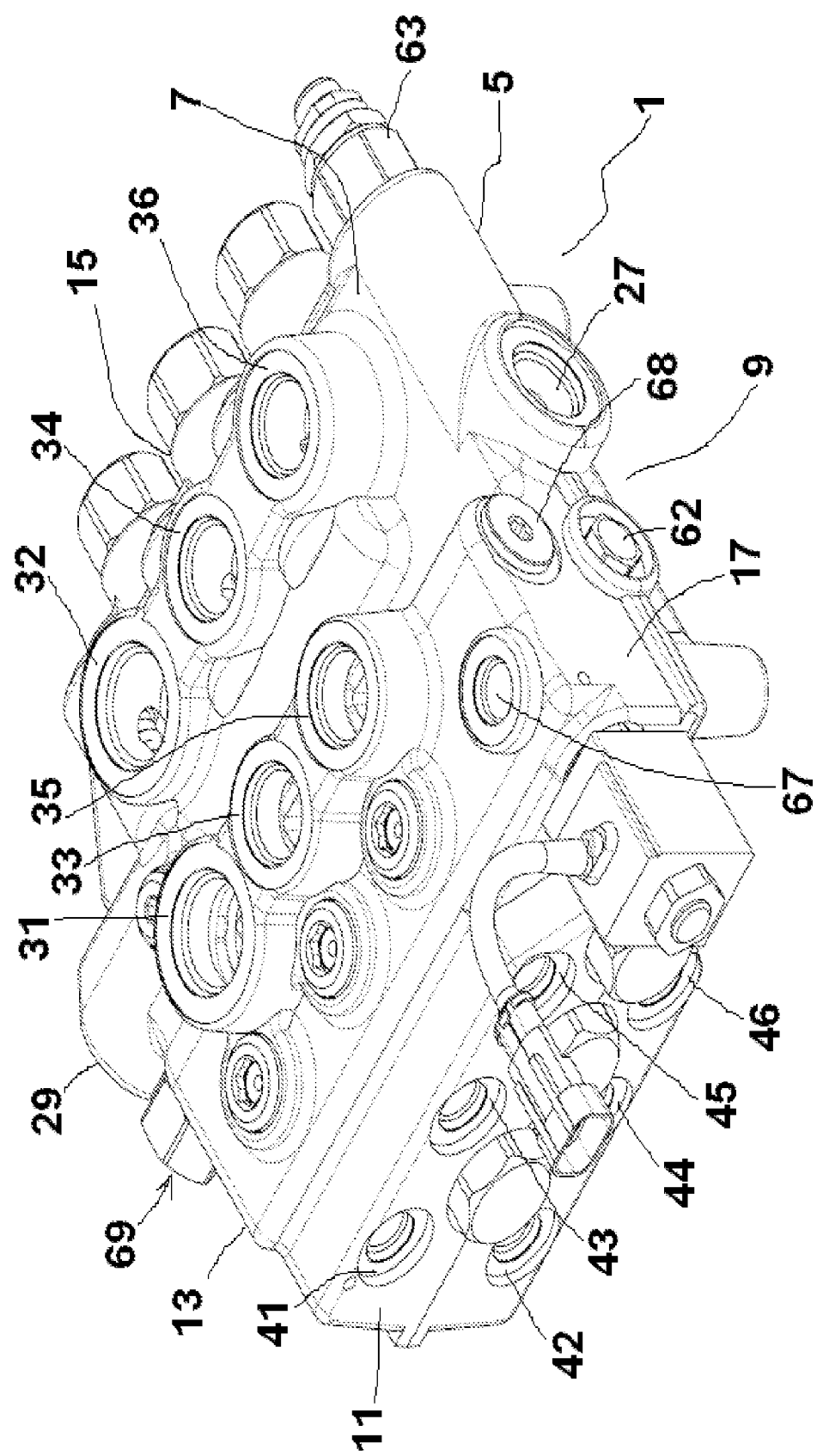
FIG. 2 is an isometric view of the valve assembly with the top face visible, the front side visible at the left and the right side visible at the right part of the figure.
Figure 3:
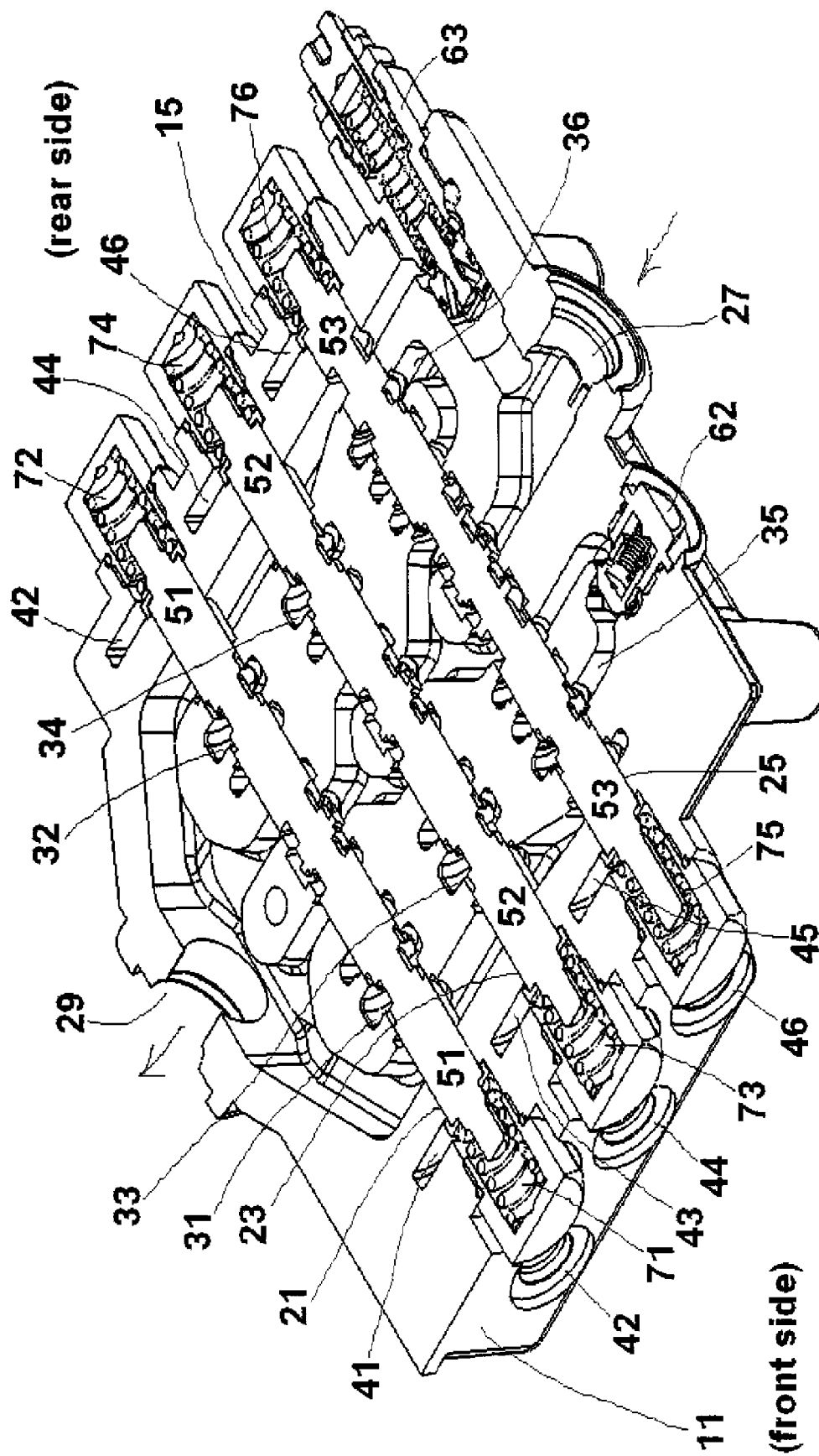
FIG. 3 is a cut-away view of the valve assembly exposing the control spools and various hydraulic fluid passages.
Figure 4:
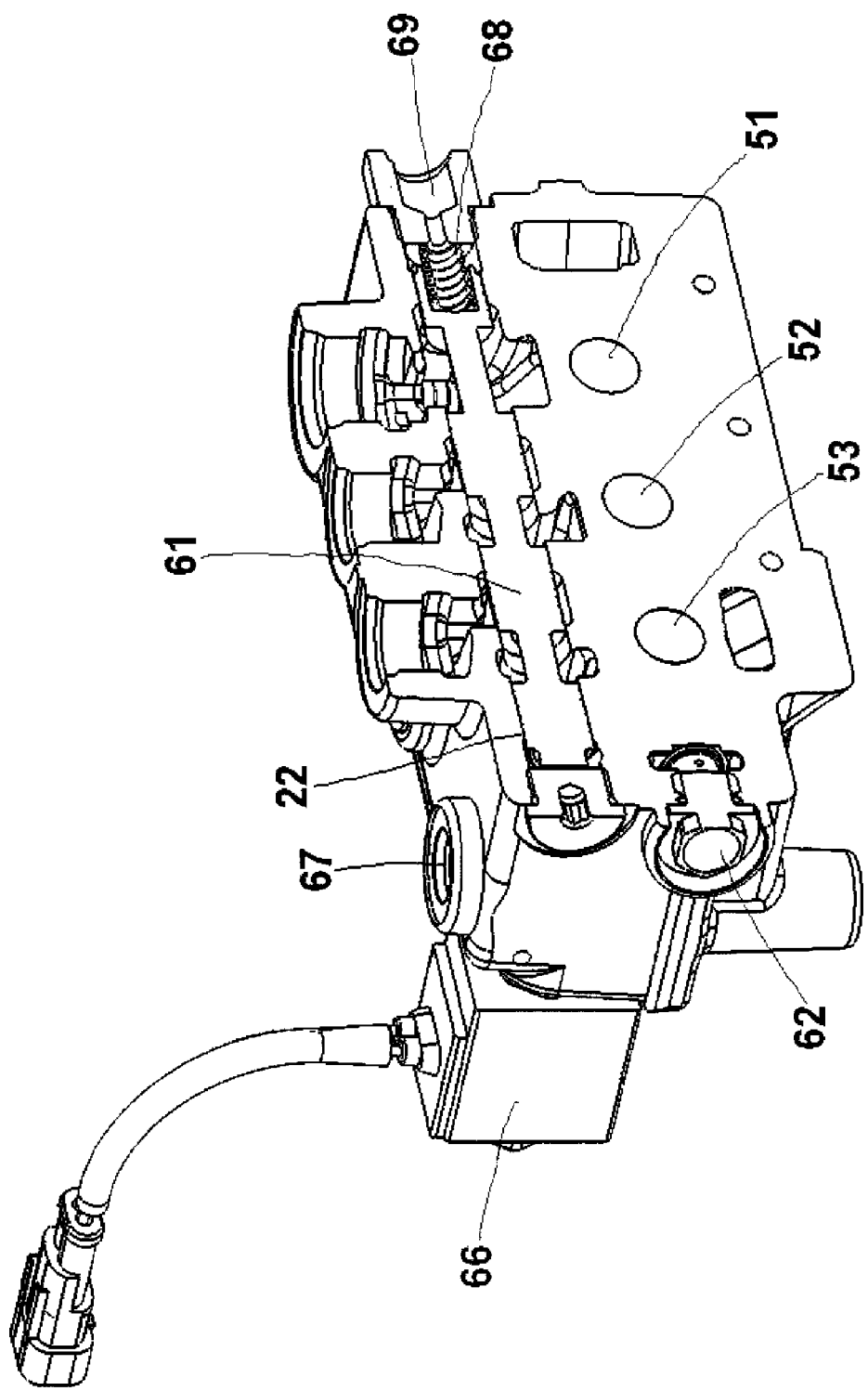
FIG. 4 is a cut-away showing the port lock valve.

With reference to FIGS. 1-3, one embodiment of the invention comprises a hydraulic valve assembly (1) with a monolithic body (5) formed of a single piece.

The body has a top face (7) and a bottom face (9) and four sides (11, 13, 15, 17) extending between the top and bottom faces (7, 9). The four sides define a front side (11), a left side (13), a rear side (15), and a right side (17). Note that the use of the terms top, bottom, front, rear, left, and right are only relative terms used to more easily describe the relative position of the various elements. The valve assembly may be installed in a number of orientations where, e.g., in a vertical mount where the top face (7) is vertically oriented. Alternatively, in a horizontal mount, the top face (7) is horizontally oriented.

As shown in FIG. 3, the body further includes plural valve bores (21, 23, 25) extending between the front side and the rear side of the valve body. A hydraulic supply inlet (27) for receiving an hydraulic supply line and a discharge tank outlet (29) are located on the left and right sides of the valve body and are in fluid communication with the valve bores (21, 23, 25).

In the embodiments of the invention using pilot port pairs (41, 42; 43, 44; 45, 46), there is at least one pilot port pair having an opening at the front side and extending to ends of one of the valve bores. Where there are plural pilot port pairs, all pilot port pairs are located on the front side, with each pilot port pair having an opening at the front side and extending to ends of a different one of the valve bores.

As shown in FIGS. 2-3, there are plural work port pairs (31, 32; 33, 34; 35, 36), each work port pair extending from the body top face to a different one of the valve bores.

As shown in FIGS. 1 and 3, there are plural control spools (51, 52, 53). One of the control spools are provided in each of the valve bores. Each control spool is moveable to control flow of hydraulic fluid between each work port and the inlet and the outlet. Also see FIGS. 13-14 for a mechanical linkage-controlled control spool (152, 153) embodiment.

There are plural side-to-side pilot port pairs (41, 42; 43, 44; 45, 46), the pilot ports of each pilot port pair extend from the body front side to opposite ends of the different valve bores. In this monolithic body embodiment, the pilot ports are all located on the one side of the valve body. That is, the pilot ports only located on the one side of the valve body. This arrangement of all the pilot ports being located in the same side of the valve body provides machining and assembly costs improvements over the prior art.

Advantageously, the pilot ports of each pilot port pair are positioned adjacent each other. For example, a first pilot port (41, 43, 45) of the pilot port pairs is located on an upper half of the front side and a second pilot port (42, 44, 46) of the pilot port pairs is located on a lower half of the front side. The first and second pilot ports of each pair are located above and below each other.

The pilot ports (43, 44; 45, 46) are used for connection to hydraulic lines or solenoid valves (e.g., 64, 65).

Further advantageously, embodiments of the invention provide that the pilot ports (43, 44; 45, 46) present a machined female connection surface for receiving a mating male hose connection element.

Figure 15A:
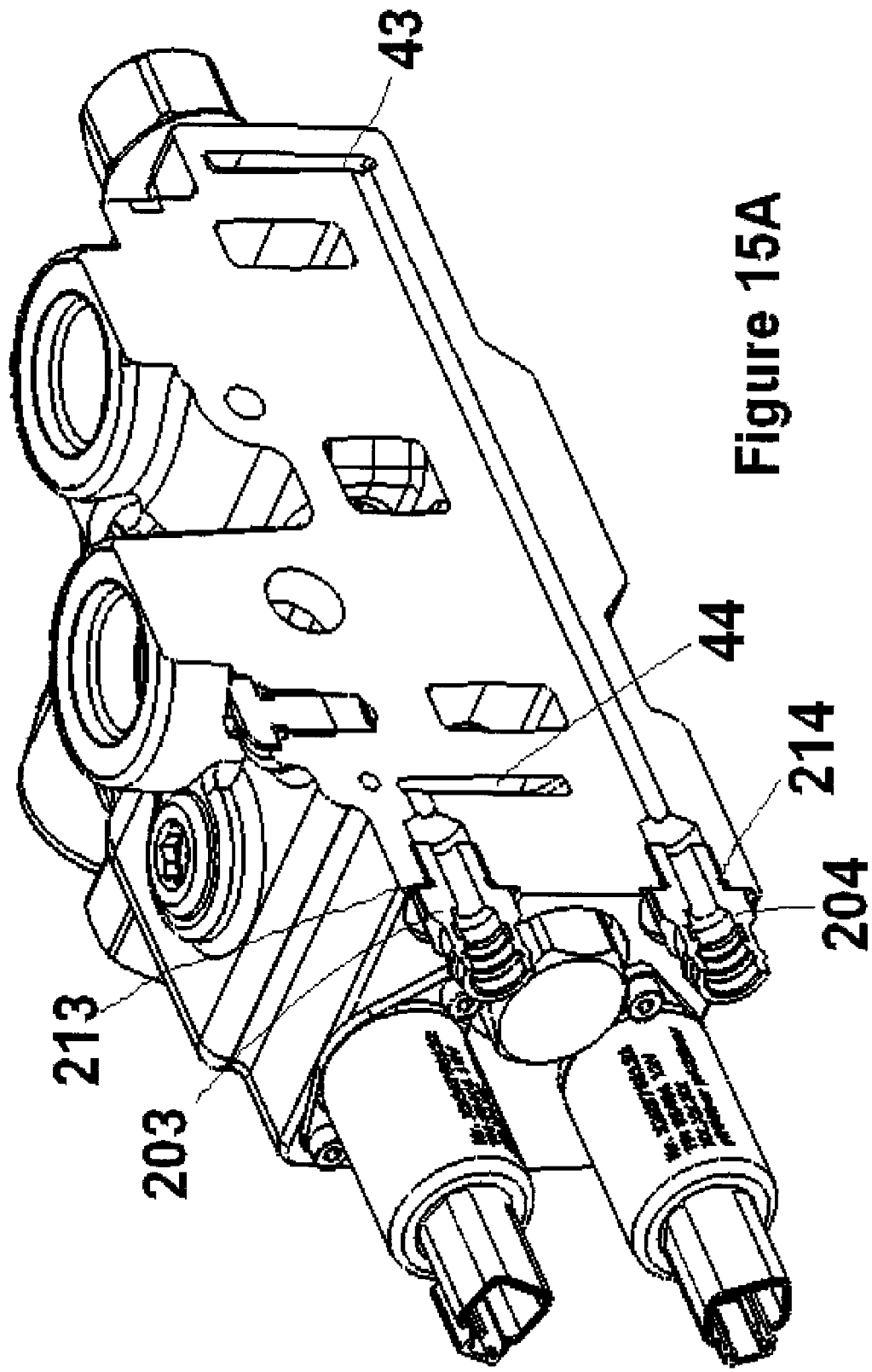
FIGS. 15A-15B respectively illustrate pilot ports with a field-installed female portion of a connection element and an embodiment with a machined female connection surface.
Figure 15B:
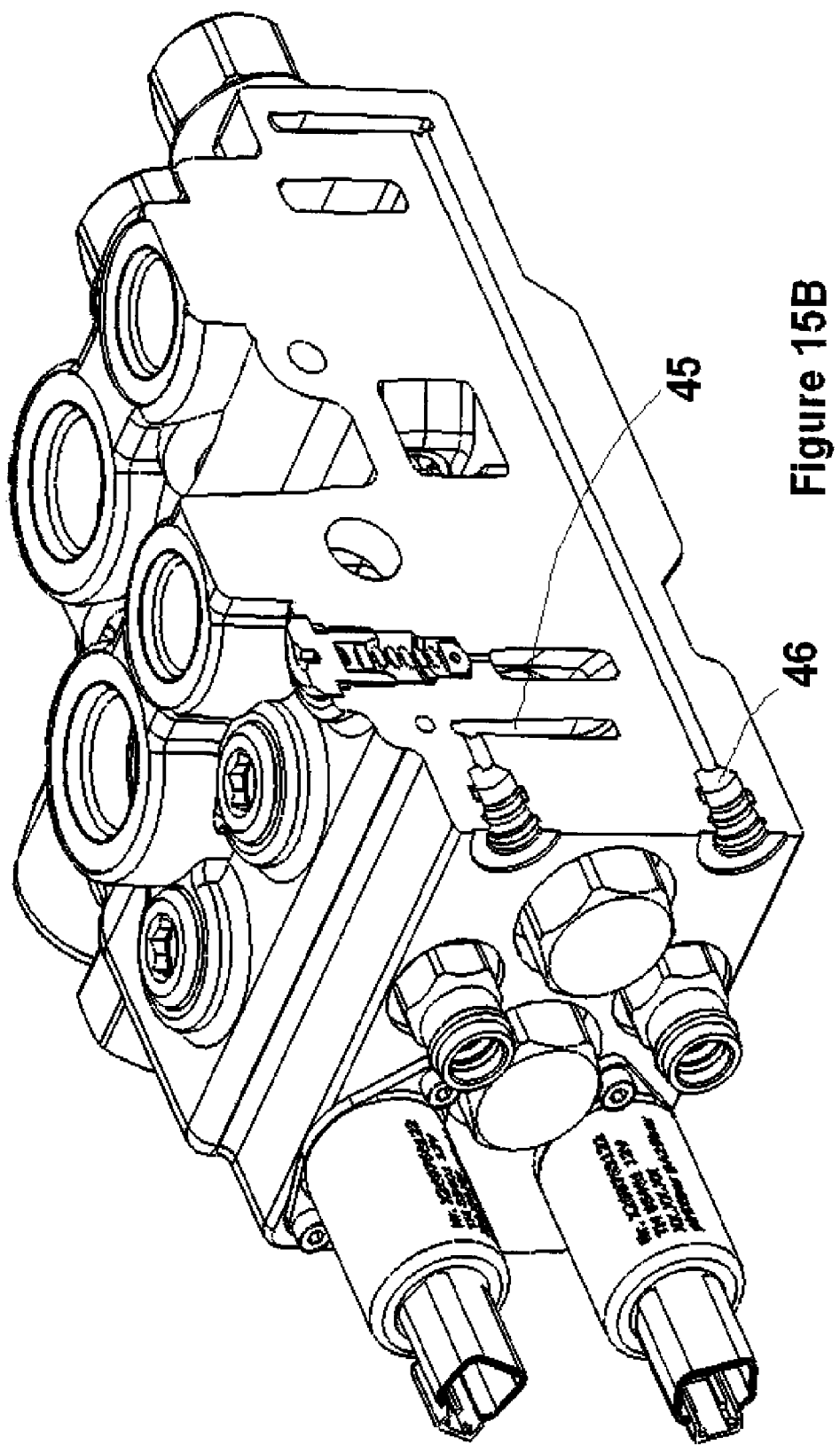

For example, the prior art has provided hydraulic lines terminating with male quick connection hose elements, also known as snap to connect, which provide one-hand connection requiring no assembly tools. FIGS. 15A-15B respectively illustrate pilot ports with a field-installed female portion of a quick connection element and an embodiment with a machined female connection surface.

The female portion of the quick connection element is field-installed into the hydraulic valve body as a special fitting (203, 204) within the fitting boring (213, 214), as shown in FIG. 15A.

In embodiments of the invention which provide the pilot ports (43, 44; 45, 46) with a machined female quick connection surface for receiving a mating male quick connection element, by providing the pilot ports with a female connection surface, this field installation is avoided as well also avoiding the possible a leaking point related to the fitting boring (213, 214). See FIG. 15B illustrating machined female quick connection surfaces at the pilot port pair (45, 46).

The pilot ports (41, 42) used for connection of solenoid valves (64, 65) present female connection surfaces for receiving a mating solenoid valve.

As shown in FIGS. 1-2, the ends of every control spool are biased by positioner springs (71, 72; 73, 74; 75, 76). The springs are retained by caps. The caps may be screw in caps. In some embodiments, the positioner springs allow pilot pressure between 6-21 bar.

Figure 10A:
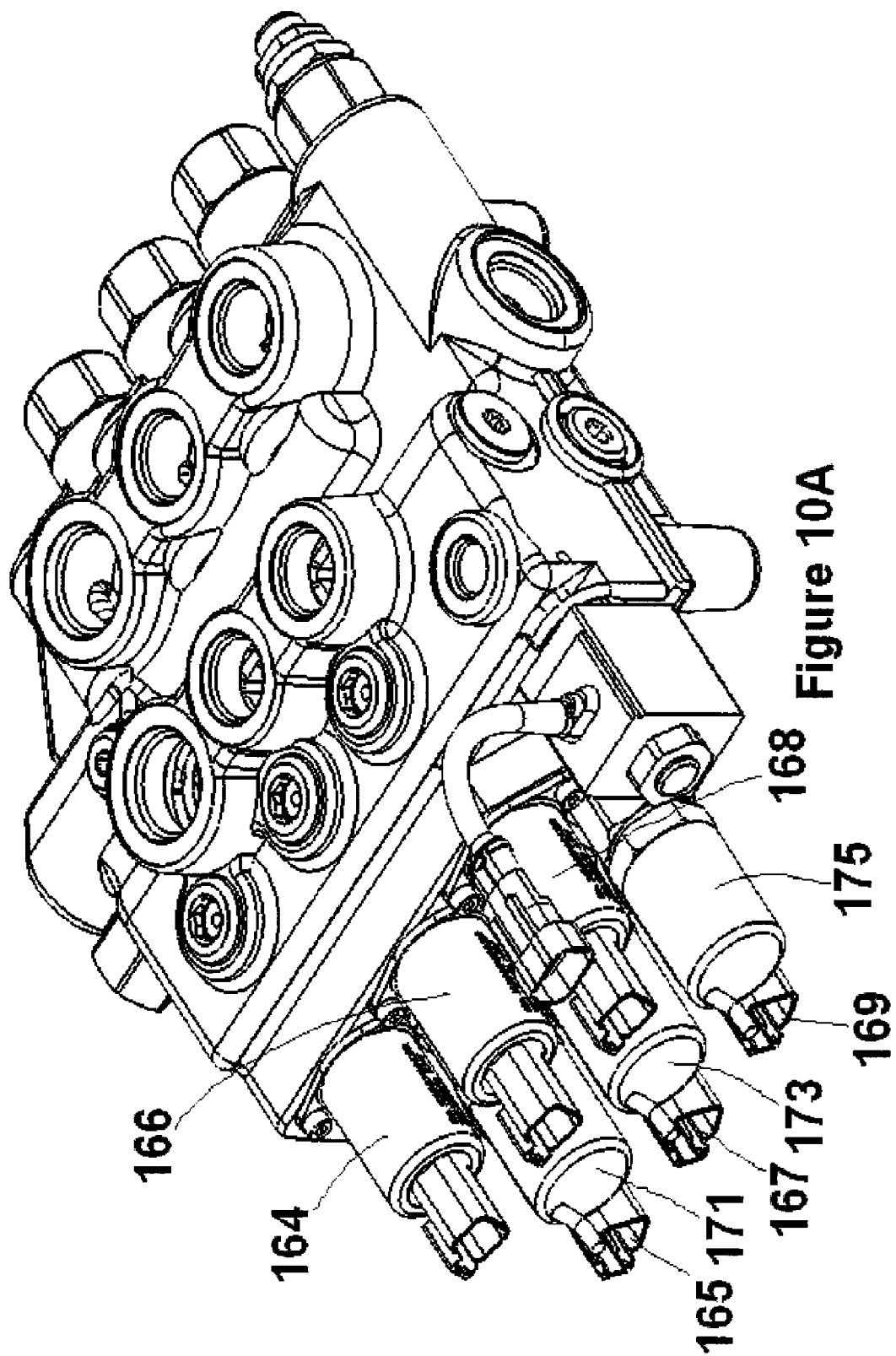
FIGS. 10A-10B are an isometric view and schematic view of an embodiment using hall effect spool position transducers.
Figure 10B:
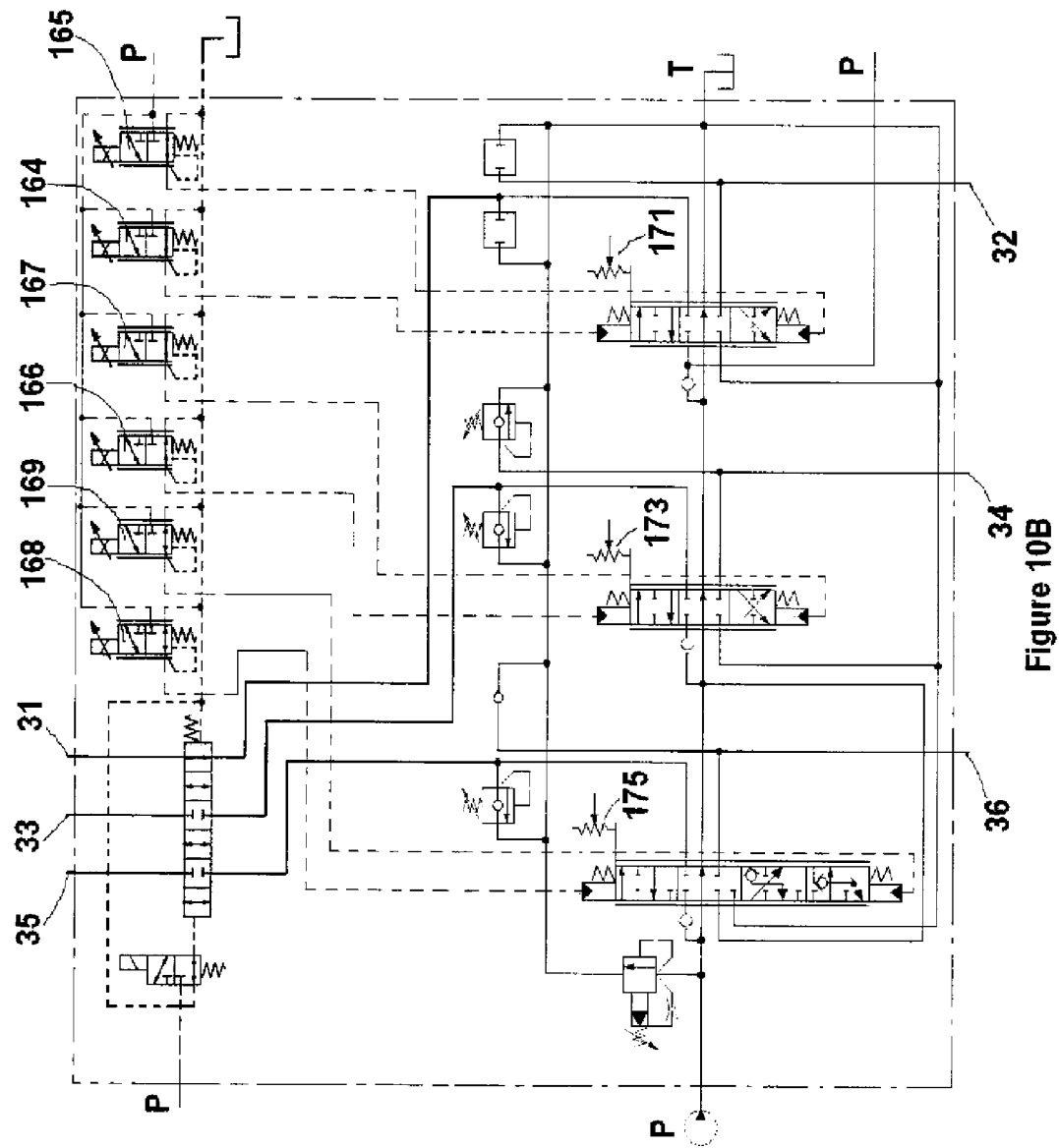
Figure 11A:
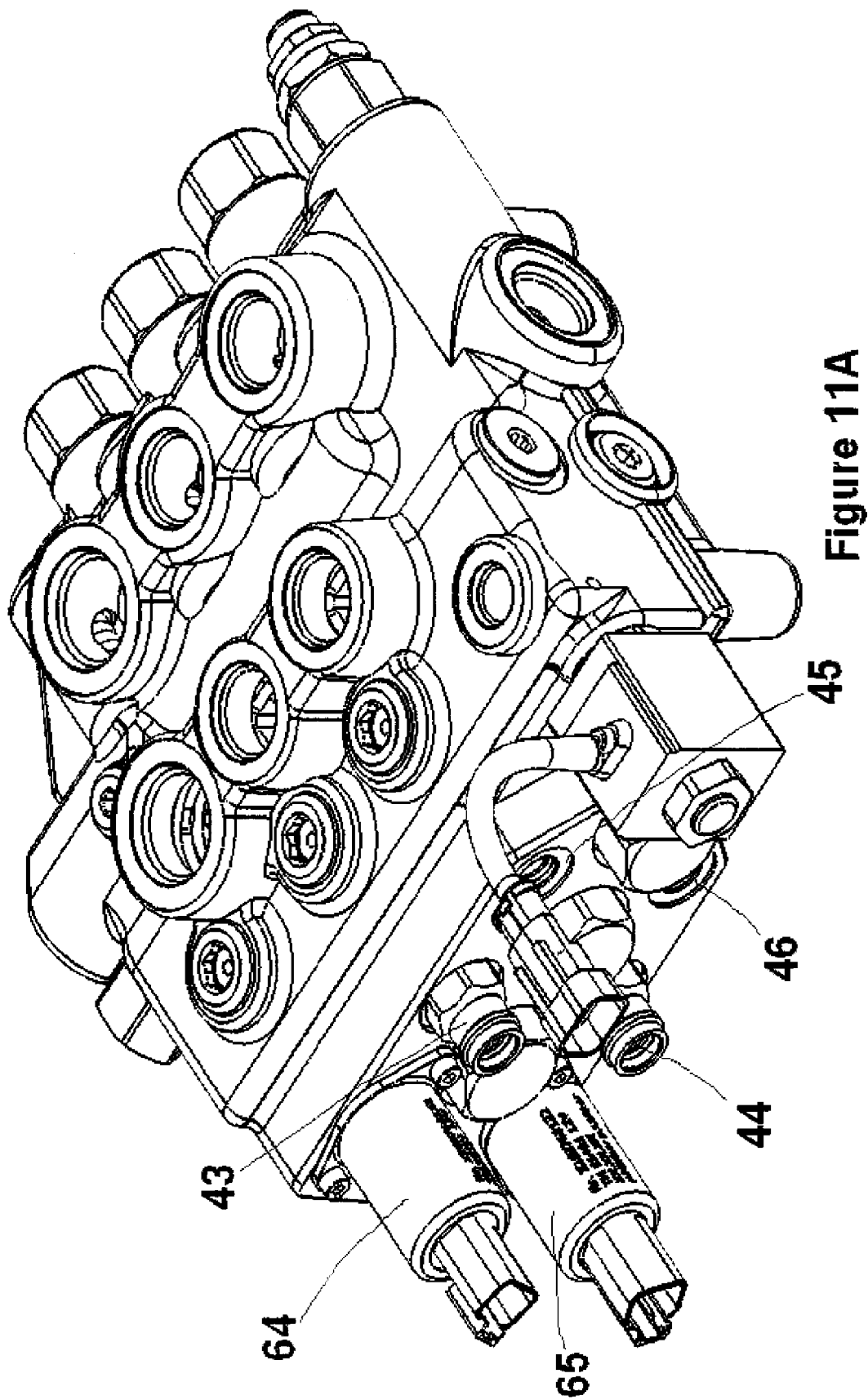
FIGS. 11A-B are an isometric view, a cut-away view, and a schematic of a pilot and electro-hydraulic controlled valve with 3 ports and a port lock valve integrated into the valve body corresponding to FIG. 1.
Figure 11B:
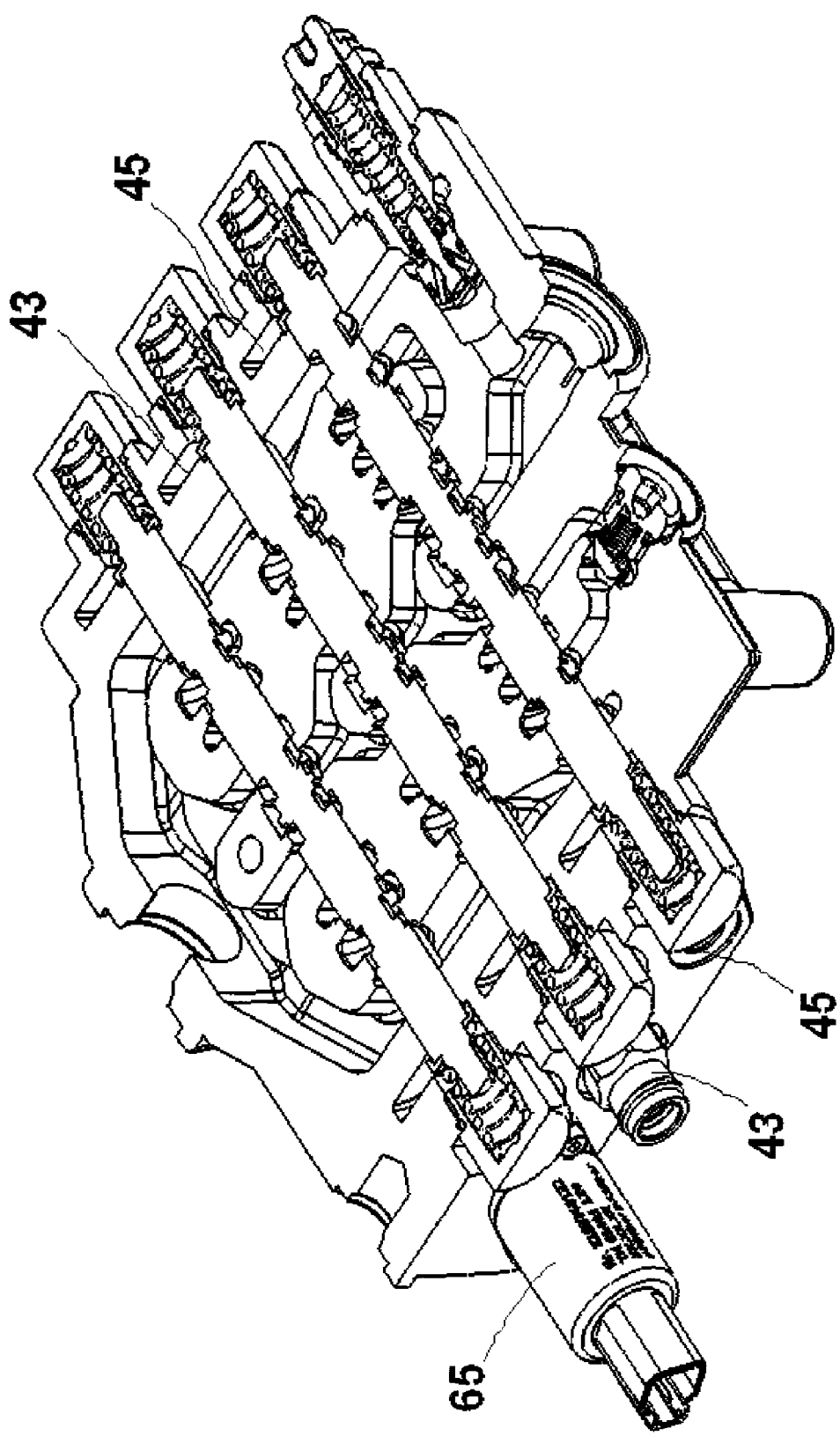

As an alternative to positioned springs, a full proportional electro-hydraulic control may be used with Hall effect spool position transducers (171, 173, 175) operated via solenoid valves (164, 165; 166, 167; 168, 169). See FIGS. 10A-10B.

Figure 12:
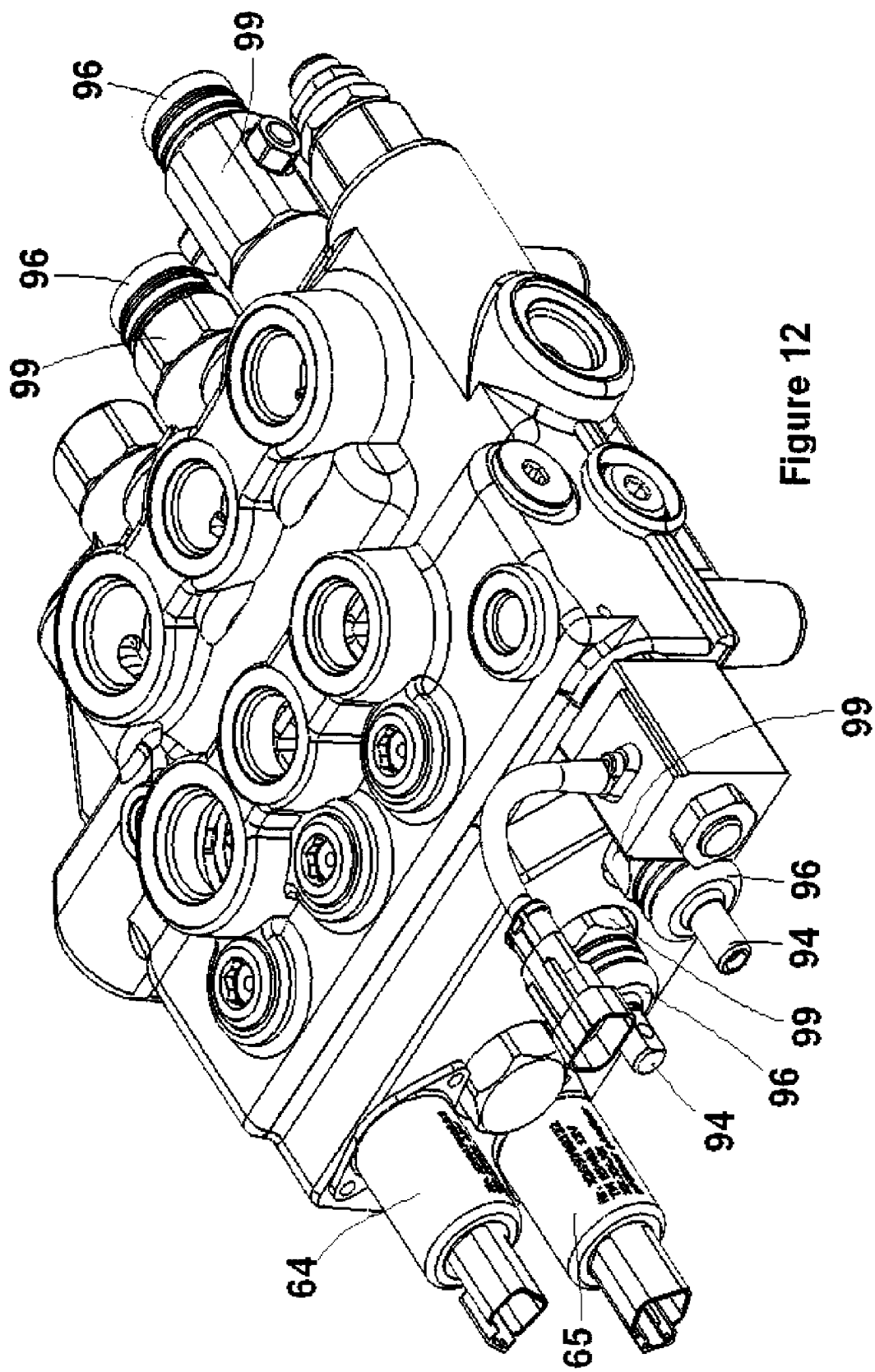
FIGS. 12-14 illustrate a mechanically and electro-hydraulic controlled valve embodiment with and a port lock valve integrated into the valve body.
Figure 13:
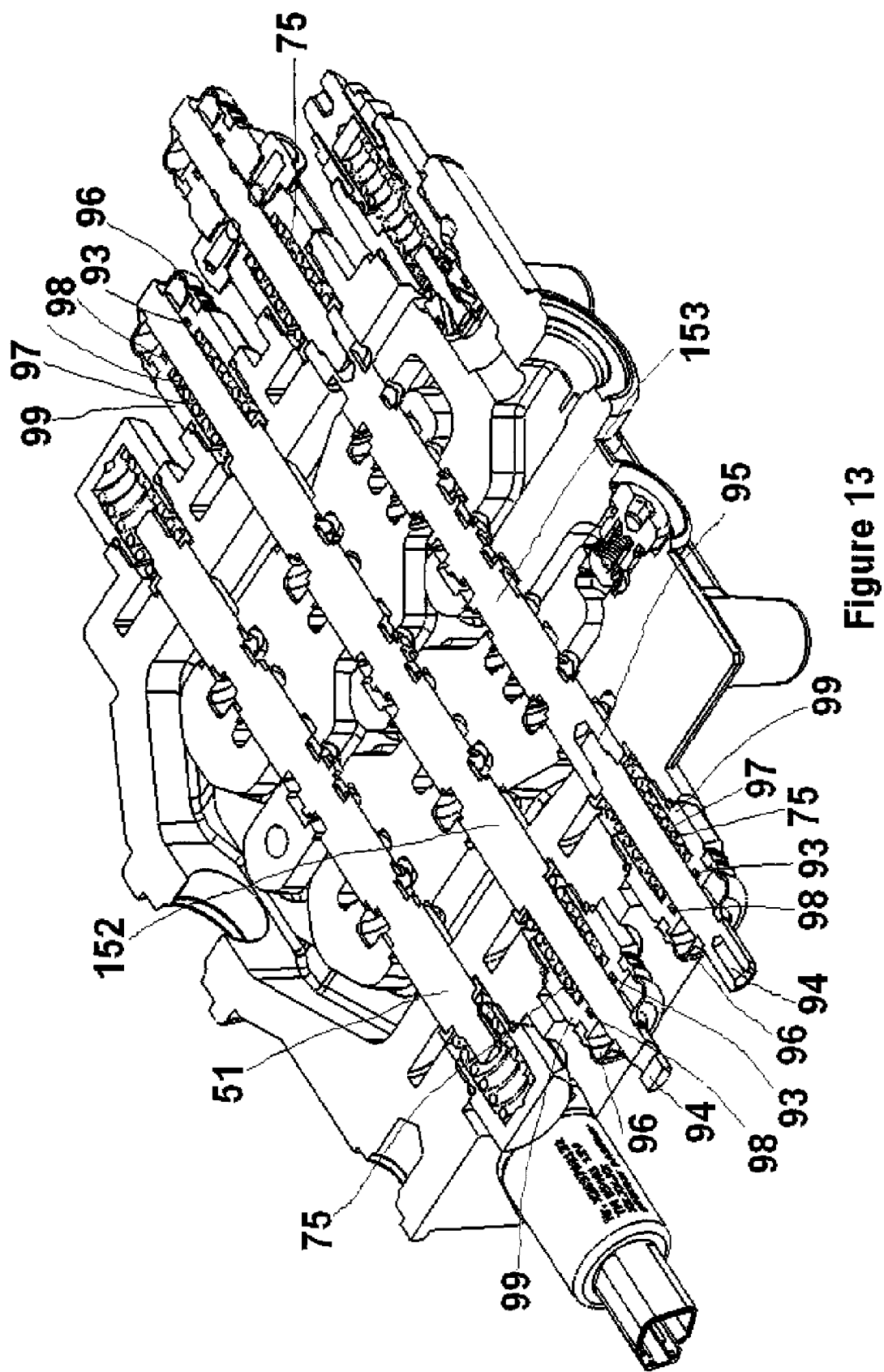
Figure 14:
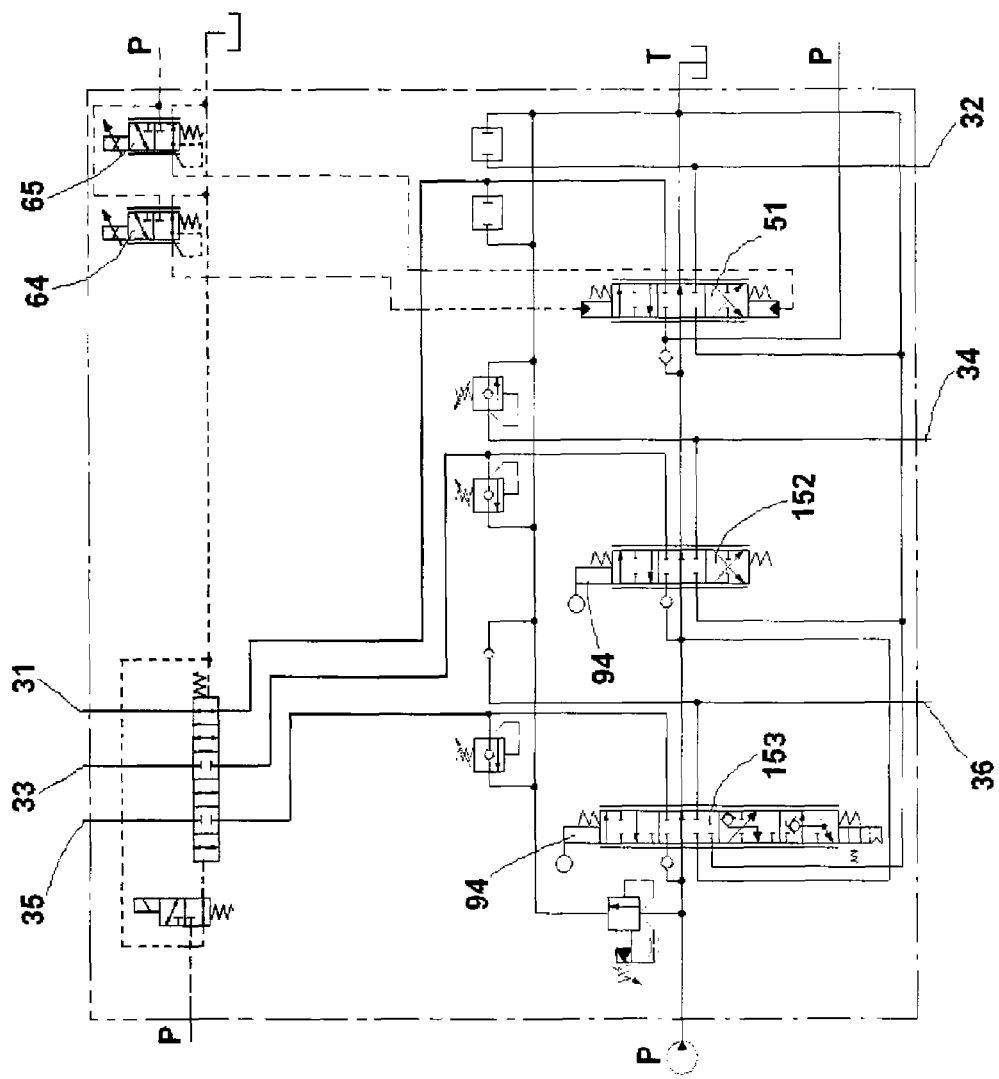

Further, as illustrated by FIGS. 12-14, a mechanically and electro-hydraulic controlled valve with 3 ports and a port lock valve integrated into the valve body, is another embodiment.

Openings are provided within the valve body for load check valves (92) and a relief valve (63).

A further load check valve (62) is used to prevent back flow only when the first spool (53) is actuated in a particular position.

The inventive valve assembly finds application in hydraulic equipment. For example, the inventive valve assembly may be used as a skid steer loader valve.

In the embodiment illustrated by FIGS. 1-4 and 11, there are three valve bores, three work port pairs, and three pilot port pairs. One of the control spools is a lift spool (53), and may be a 16 mm diameter series spool with a 6.5 mm stroke in both directions and a 10 mm float. The two other control spools are a tilt spool and an auxiliary spool (51, 52), and may be a 16 mm diameter parallel spool with a 6.5 mm stroke in both directions. Thus, there are three separately operable valves (81, 82, 83).

A main relief valve (63) is in fluid communication with inlet port (27) and tank port (29).

The first valve (81) is controlled by the solenoid valves (64, 65). See FIGS. 1 and 11A.

The operator, using the control mechanism, controls the equipment by varying the hydraulic pressure applied to the ends of a specific control spool. Increasing the pressure at a first end of the bore, biases the specific control spool to move toward the second end of the bore, thereby positioning the spool to open a passage between the supply inlet (27) and the corresponding work port pair connected to the cylinder-piston arrangement of the hydraulic work element being controlled. Based on positioning of the control spools, i.e., the movement of the specific control spool, hydraulic fluid is allowed to flow and pressurize and depressurize different sides of cylinder-piston via hydraulic lines connected to the work port pair.

For this purpose, the hydraulic supply line inlet (27) accepts pressurized hydraulic fluid that then flows through the appropriate bore (of 21, 23, 25) via the biased control spool to one port of a specific work port pair that is connected to the hydraulic work element in order to pressurize and fill one side of the hydraulic work element, e.g., a hydraulic cylinder that moves a power equipment piece, e.g., a hydraulic cylinder that raises a skid steer loader bucket. To depressurize the other side of this hydraulic work element, the hydraulic discharge tank outlet (29) accepts hydraulic fluid that flows also through the bore via the biased control spool from other work port of the work port pair that is connected to depressurizing side of a hydraulic work element. In this way, a differential pressure is created across that work element in order to affect the desired result, e.g., to raise the skid steer loader bucket.

Which work port pair is put into this active state is determined by biasing the control spools (51, 52, 53) in a conventional way, e.g., either through pilot port pairs (41, 42; 43, 44; 45, 46) or by the mechanical linkage connected to a mechanical linkage-controlled control spool (152, 153).

The inventive valve assembly also includes an embodiment comprising a port lock valve safety feature. See FIG. 4.

The port lock valve safety feature is achieved with a single port lock spool (61) located in fluid flow intermediate the openings of the first work ports (31, 33, 35) and the three valve bores. See FIG. 1.

The port lock spool is moveable and operatively connected to lock at least two of the first work ports at the same time, wherein, with the first work ports locked, fluid flow is prevented to the corresponding valve bores so as to shut down any fluid flow to the bore and from the bore. The port lock spool may also lock up to three ports at the same time.

The port lock spool may be either integral with or non-integral with the monolithic valve body.

The port lock spool may be operated under control of a single or two solenoid valves.

In the embodiment of FIGS. 1-3, the port lock spool is integral within the monolithic vale body and is controlled by a solenoid valve (66) and a return positioning spring (68). In other embodiments, the port lock valve is not integral with the valve body and is attached to the valve body, e.g., by mechanical fasteners.

More specifically, with reference to FIGS. 1-5, a port lock bore (22) is provided within the monolithic valve body (5), the port lock bore is transverse to the other valve bores (21, 23, 25) and is located over the other valve bores (21, 23, 25).

A port lock spool (61) is movably located within the port lock bore (22). A positioning spring (68) is engaged at a first end of the port lock spool and a solenoid valve (66) is at a second end of the port lock spool. A pilot pressure port (67) is connected to the solenoid valve (66) to controllable allow external pilot pressure from, e.g., a hydrostat charge pump to enter and act against the port lock spool (61).

The port lock spool (61) may be a 16 mm spool.

Figure 5A:
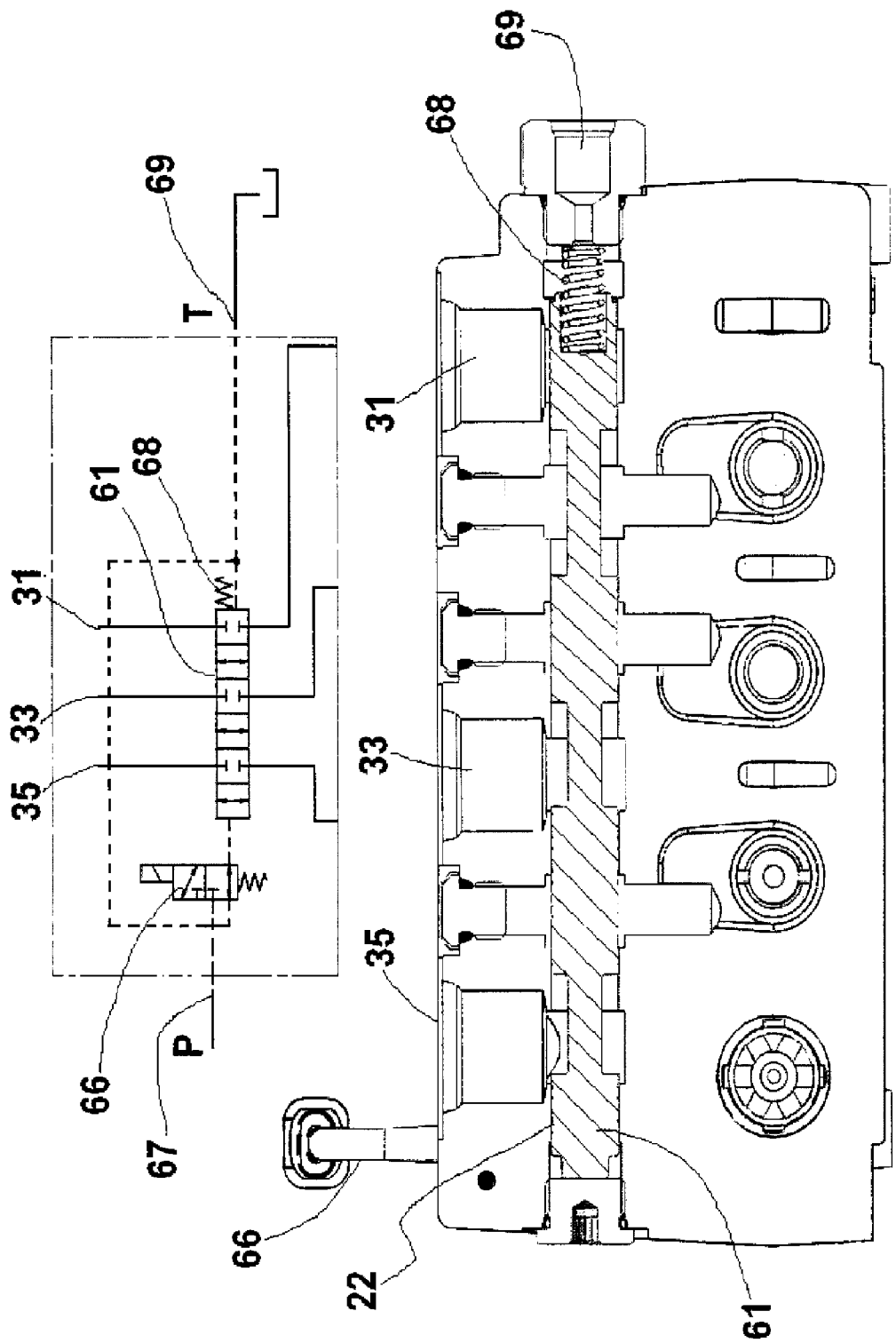
FIGS. 5-7 are other cut-away and schematic views of the port lock valve.
Figure 5B:
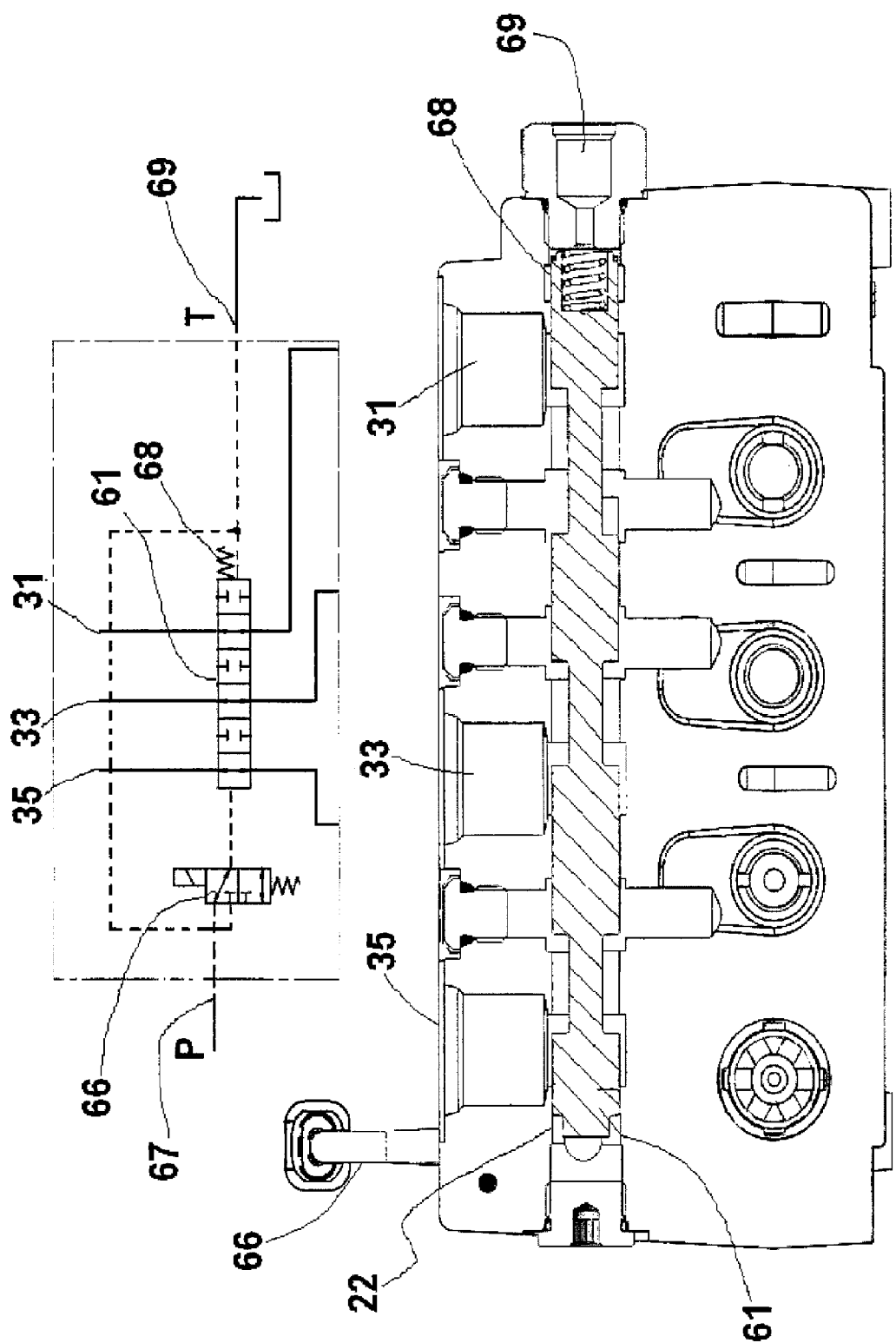

As illustrated in FIGS. 5A-5B, the port lock valve may operate as an ON-OFF valve for all three ports. In a resting position of the port lock spool, with the solenoid valve (66) non-actuated, both ends of the port lock spool are connected to a tank discharge outlet (69) and all three of the first work ports are locked close. See FIG. 5A.

In an actuated position of the port lock spool, with the solenoid valve (66) actuated, the solenoid valve opens to expose external pilot pressure via the pilot pressure port to push the spool into a position with all three ports opened, allowing fluid flow from the first work ports to the corresponding valve bores. See FIG. 5B.

Figure 6A:
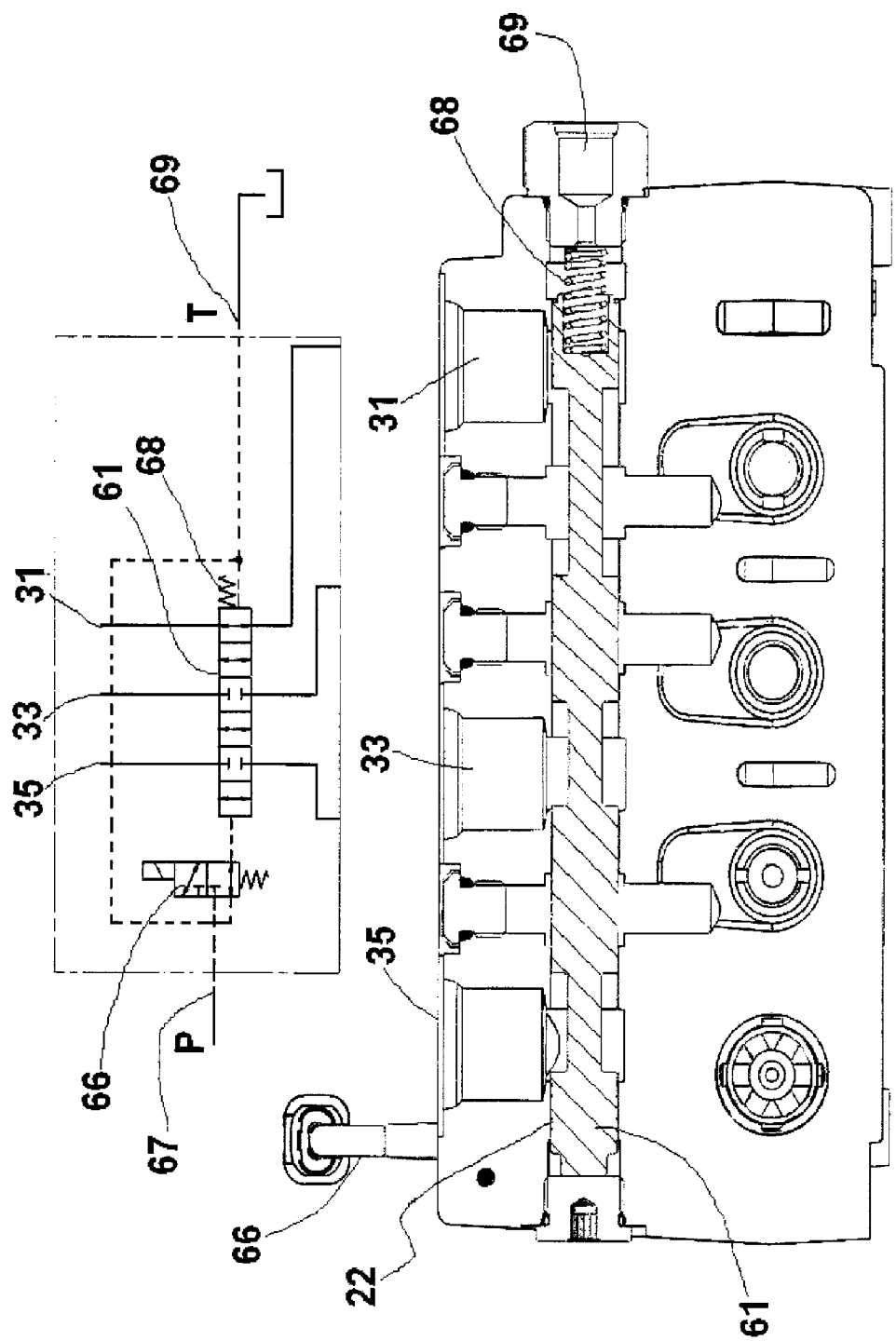
Figure 6B:
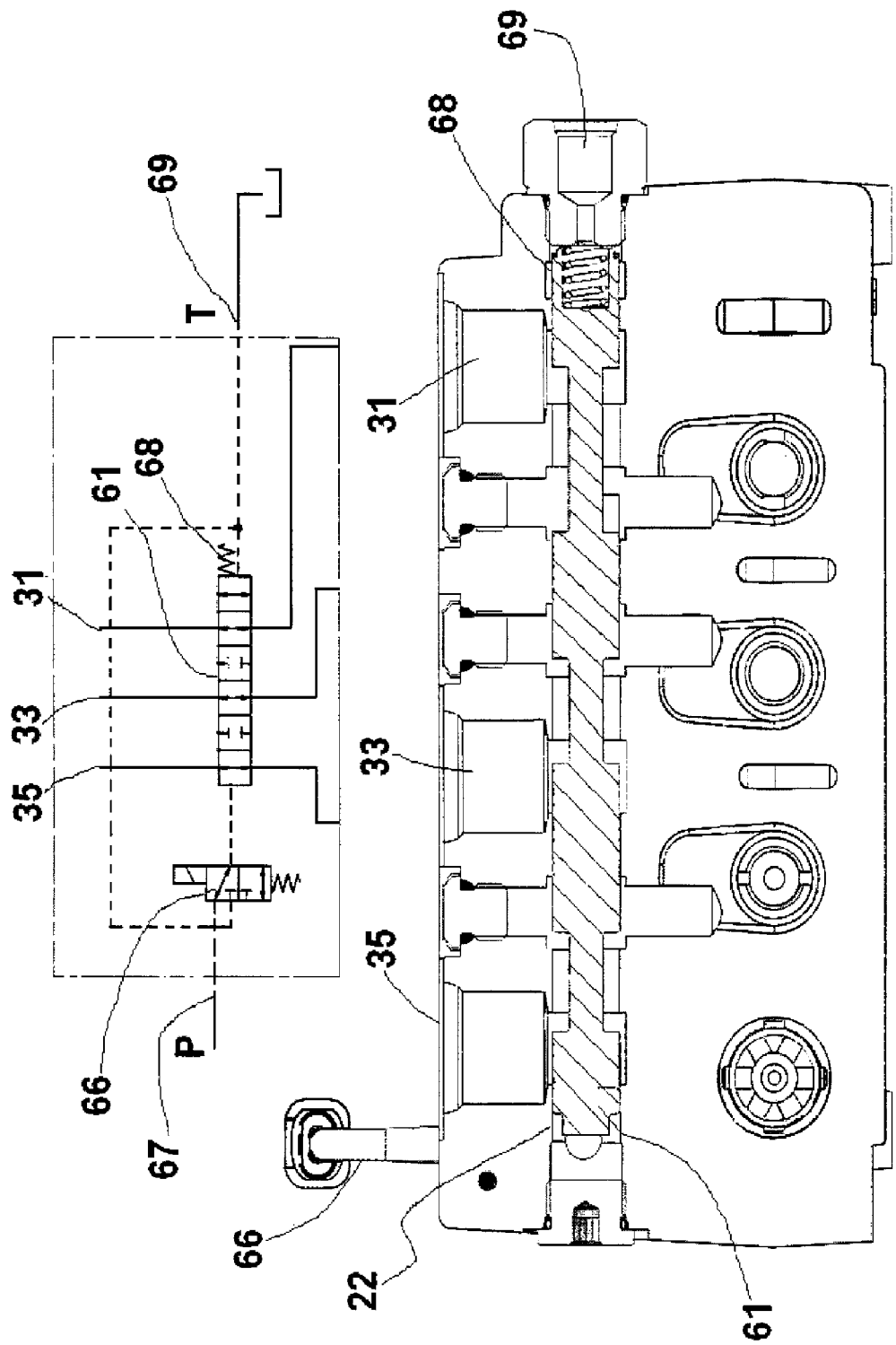

As illustrated in FIGS. 6A-B, the port lock valve may operate as an ON-OFF valve for two of the three ports. In a resting position of the port lock spool, with the solenoid valve (66) non-actuated, the ports (33, 35) to the lift and tilt spools (53, 52) are closed and the port to the auxiliary spool (51) is open. See FIG. 6A.

In an actuated position of the port lock spool, with the solenoid valve (66) actuated, the solenoid valve opens to expose external pilot pressure via the pilot pressure port to push the spool into a position with all three ports opened, allowing fluid flow from the first work ports to the corresponding valve bores. See FIG. 6B.

Figure 7A:
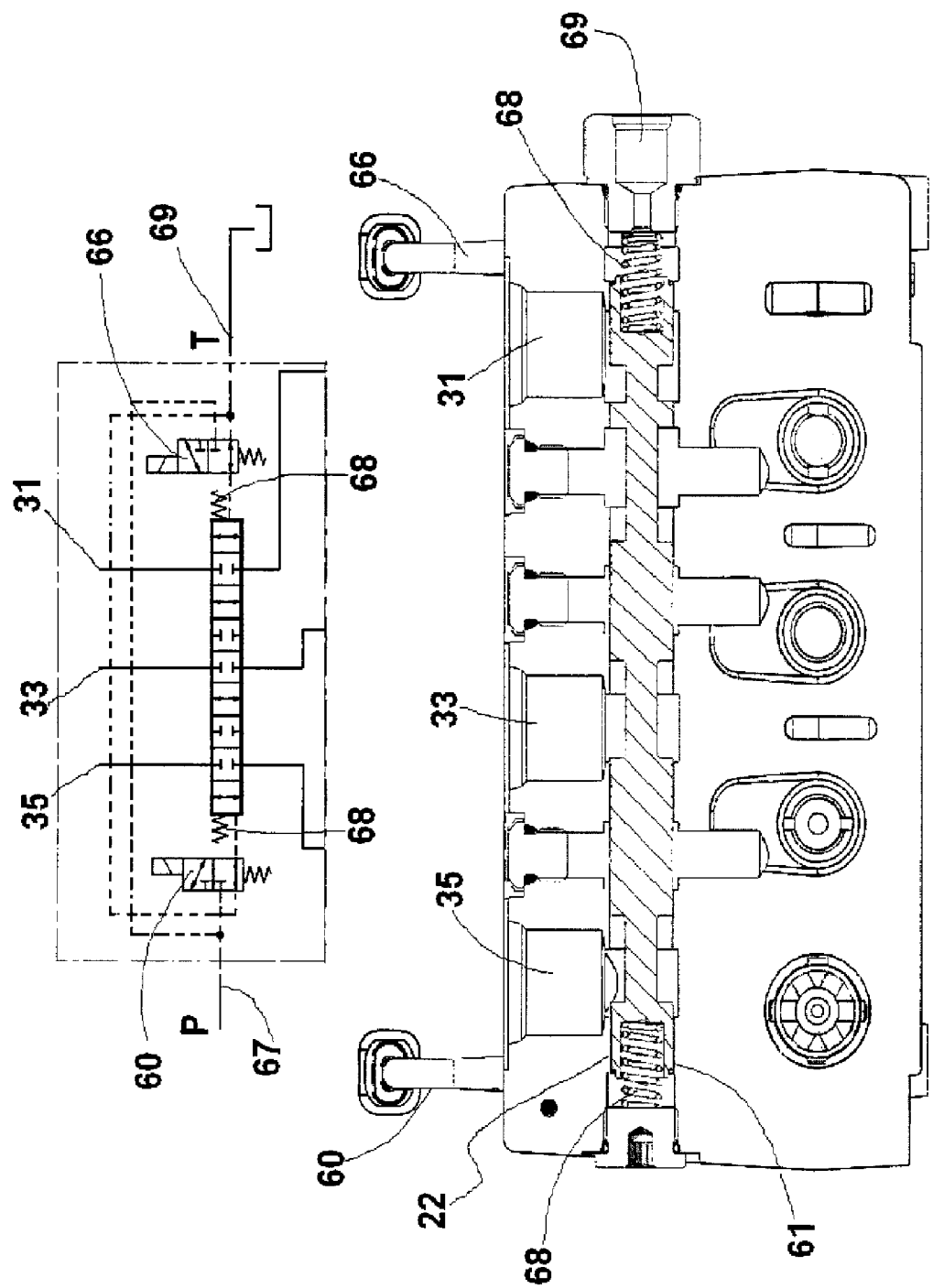
Figure 7B:
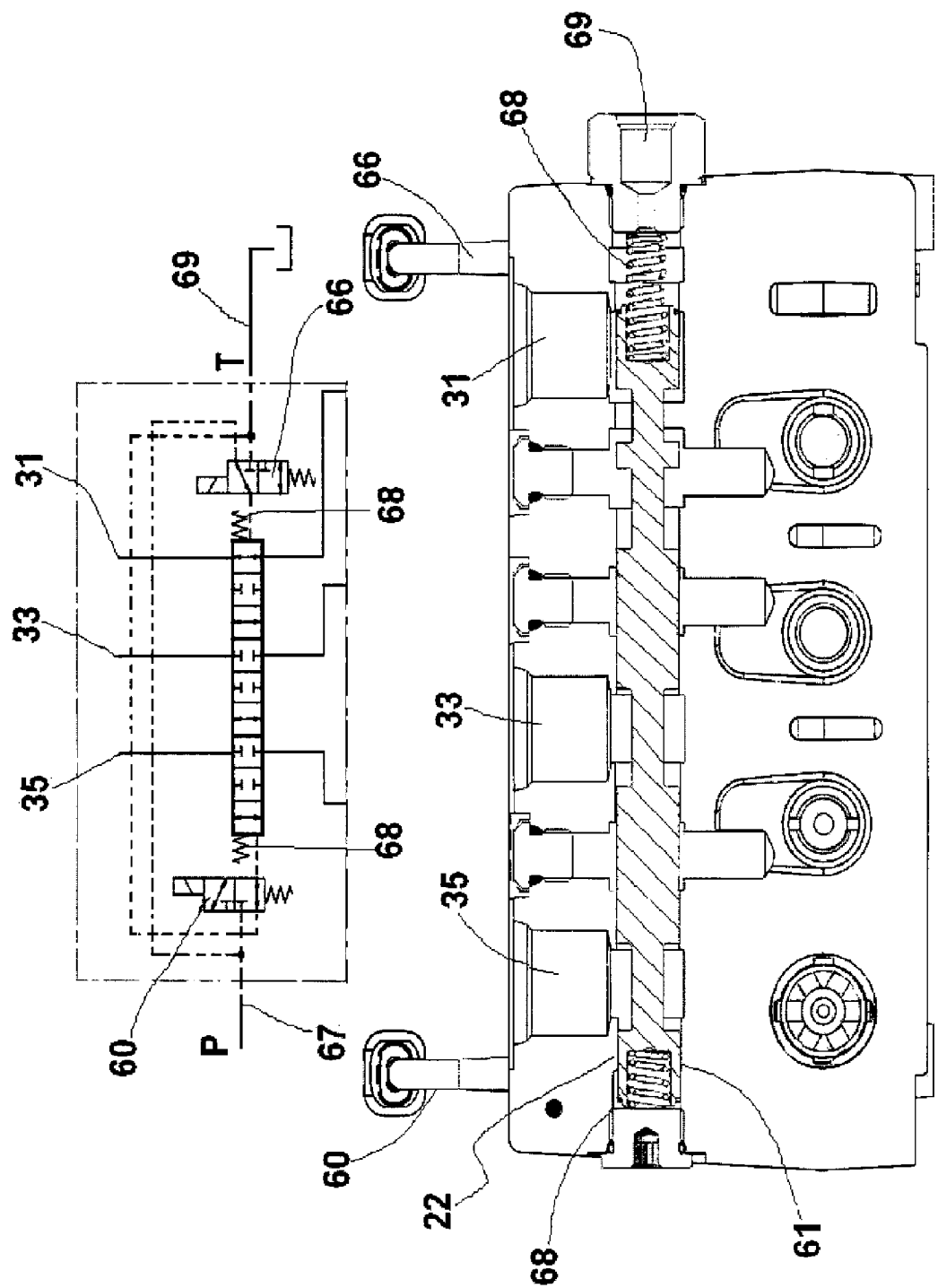
Figure 7C:
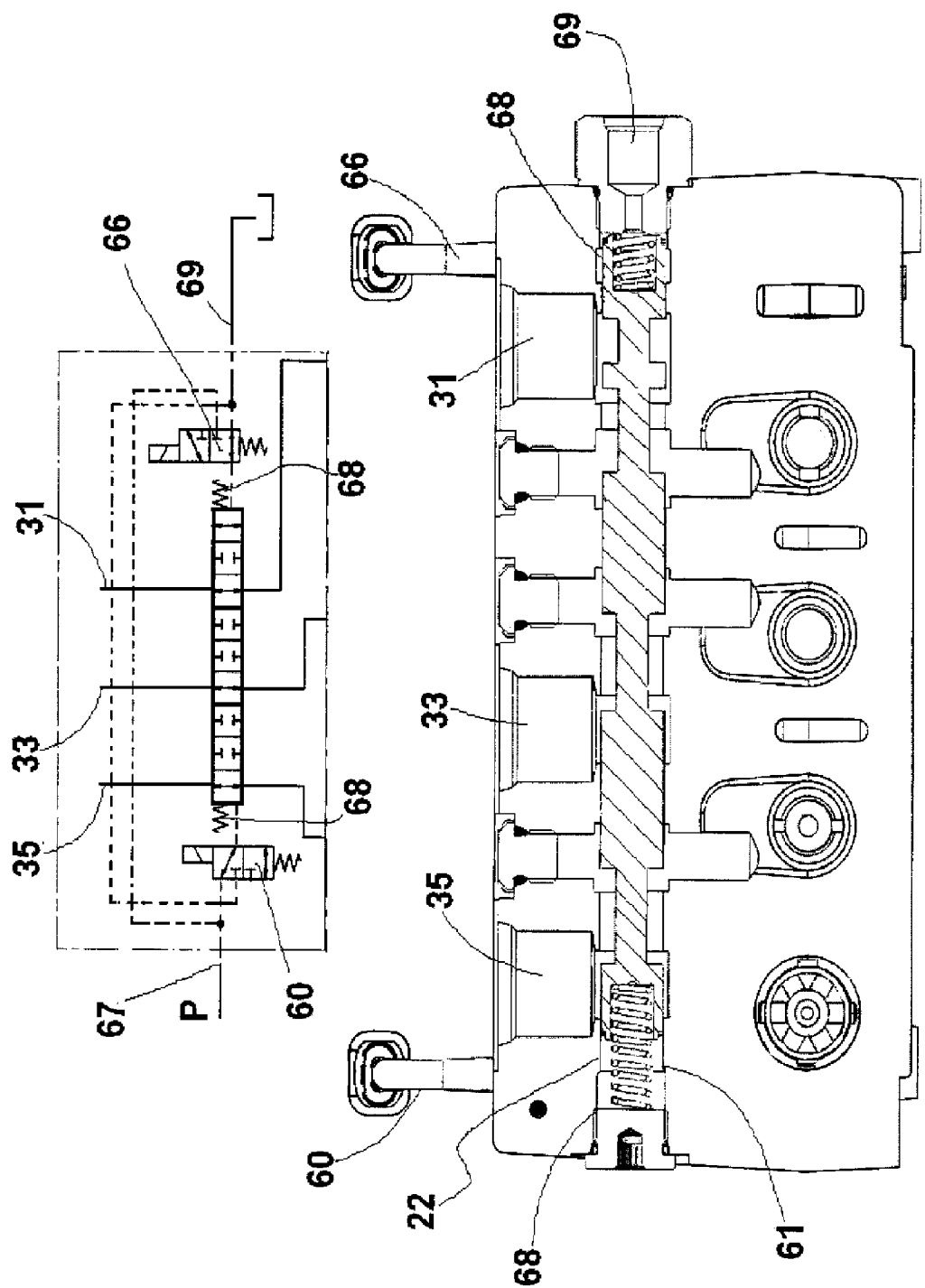

Alternatively, as illustrated in FIGS. 7A-C, a two stage ON-OFF configuration is provided.

In this embodiment there are two port lock spool solenoid valves (66, 60).

In this embodiment, in a resting position of the port lock spool, with both the first solenoid valve (66) non-actuated and the second solenoid valve (60) non-actuated, both ends of the port lock spool being connected to a tank discharge outlet (69) and all three of the first work ports (31, 33, 35) are locked close. See FIG. 7A.

In a first stage actuated position of the port lock spool, with the first solenoid valve (66) actuated (the right side solenoid valve), the solenoid valve opens to expose external pilot pressure via the pilot pressure port to push the spool into a position with only one of the three of the first work ports open and the other two of the three of the first work ports locked close, allowing fluid flow from the one open first work port to the corresponding valve bore. See FIG. 7B.

In a second stage actuated position of the port lock spool, with the second solenoid valve (60) actuated (the left side solenoid valve), the solenoid valve opens to expose external pilot pressure via the pilot pressure port to push the spool into a position only with all three of the first work ports opened, allowing fluid flow from all three of the first work ports (31, 33, 35) to the corresponding valve bores. See FIG. 7C.

Thus, as shown by these example embodiments of FIGS. 5-7, with the same port lock bore, differently shaped port lock spools are selectable to achieve different operational results such that using an ON-OFF spool or a proportional spool changes the port lock valve's functionality.

Figure 8:
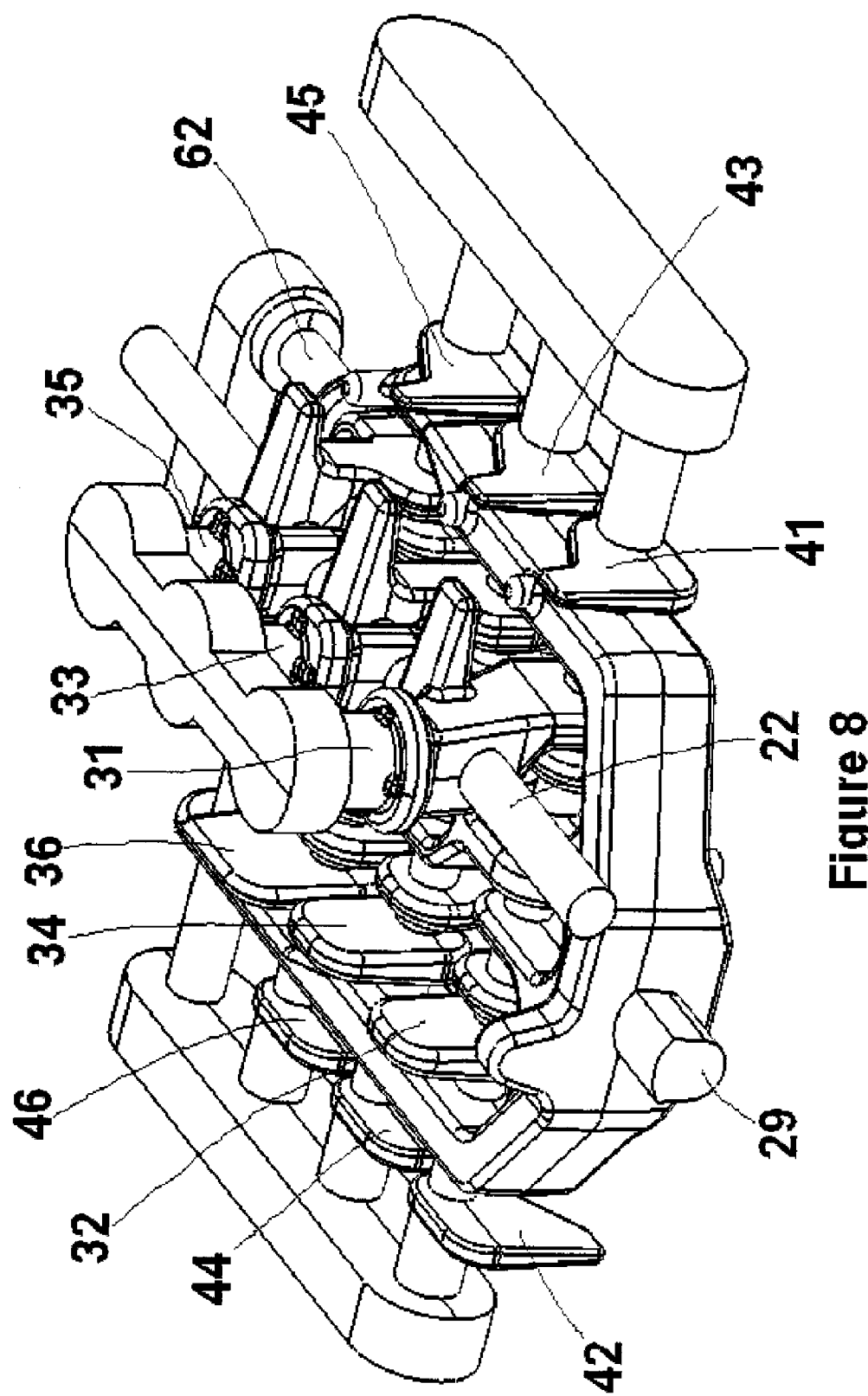
FIGS. 8-9 are casting isometric views of the monolithic valve body including the single spool port lock valve.
Figure 9:
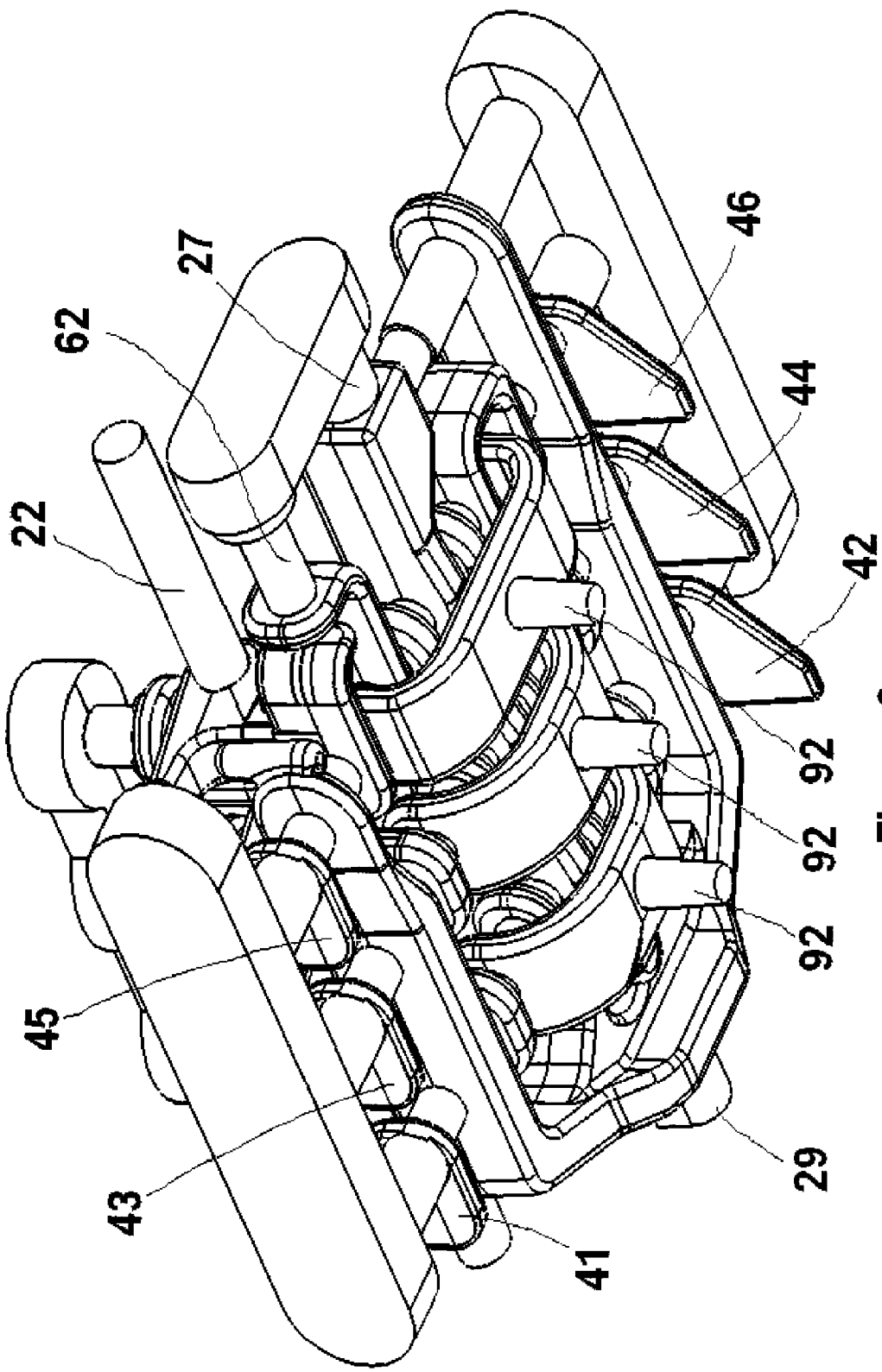

FIGS. 8-9 are casting isometric views of the monolithic valve body including the single spool port lock valve showing the modeling cores. FIG. 8 is a view with the right side including the discharge tank outlet (29) facing the front. FIG. 9 is a bottom view showing the location of the load check valves (92). Positioning the load check valves on the bottom allows for the provision of larger internal passages without increasing the bulk of the valve body.

As illustrated by FIGS. 12-14, another embodiment provides a mechanically and electro-hydraulic controlled valve with 3 ports and a port lock valve integrated into the valve body, is another embodiment.

Each mechanically controlled valve comprises a mechanical linkage-controlled control spool (152, 153). These mechanical linkage-controlled control spools (152, 153) extend beyond the valve body (5) and directly connect with a mechanical linkage at mechanical connector (94). The end portion of the mechanical linkage-controlled control spool (152, 153) may be integral with the remaining portion of the mechanical linkage-controlled control spool (152, 153) or may be connected to the remaining portion of the mechanical linkage-controlled control spool (152, 153) at a threaded joint (95). This allows for providing end portions having mechanical connectors (94) suitable for different mechanical linkages. Note that FIGS. 12-13 show two different type mechanical connectors (94).

In contrast to the prior art, the space around the positioned springs (75) comprised a wet cavity (filled with hydraulic fluid) and surrounding the positioned springs. An o-ring (93) is provided with a recess (98) located at a distal end of a spring-containing cap (99).

In this way, hydraulic fluid is maintained within the space between the cap (99) and the spool (152, 153) and defines the spring wet cavity (97). The wet cavity configuration advantageously reduces corrosion and friction.

An o-ring (93) positioned into the grove (98) acting against the spool (152, 153) passing through the cap (99) prevents oil from leaking from the wet cavities (97) to the outside. A boot (96), e.g., a rubber boot, is provided at the distal end of the cap (99) to prevent contaminants from infiltrating into the grove (98) damaging the spool o-ring (93) and reducing its life and resulting in a premature leak.

Thus, the invention advantageously provides various embodiments for hydraulic valve assemblies specific to given equipment applications including, for example, 1) a pilot operated monolithic valve body with 3 ports and a port lock valve integrated into the valve body, 2) a full electro-hydraulic control in a valve having 3 ports and a port lock valve integrated into the valve body, 3) a mechanically operated valve with at least two ports and a port lock valve integrated into the valve body, 4) manually operated valve with 3 ports and a double stage port lock valve integrated into the valve body, 5) a mechanically and electro-hydraulic controlled valve with 3 ports and a port lock valve integrated into the valve body, and 6) pilot and electro-hydraulic controlled valve with 3 ports and a port lock valve integrated into the valve body.

Element Listing
hydraulic valve assembly (1)
monolithic body (5)
body top face (7)
body bottom face (9)
four body sides (11, 13, 15, 17)
body front side (11), left side (13), rear side (15), and right side (17)
valve bores (21, 23, 25)
port lock bore (22)
body inlet (27)
body outlet (29)
work port pairs (31, 32; 33, 34; 35, 36)
pilot port pairs (41, 42; 43, 44; 45, 46)
first pilot ports (41, 43, 45)
second pilot ports (42, 44, 46)
control spools (51, 52, 53)
lock spool (61)
load check valve (62)
check valves (92)
main relief valve (63)
solenoid valves (64, 65)
port lock spool solenoid valve(s) (66)
second inlet (67)
positioning spring (68)
tank discharge outlet (69)
position springs (71, 72; 73, 74; 75, 76)
three valves (81, 82, 83)
load check valves (92)
o-ring (93)
mechanical connector (94)
threaded joint (95)
boot (96)
spring wet cavities (97)
recess (98)
spring-retaining cap (99)
mechanical linkage-controlled control spool (152, 153)
solenoid valves (164 . . . 169)
Hall effect spool position transducers (171, 173, 175)
female portion of quick connection (203, 204)
fitting boring (213, 214).

The invention claimed is:

1. A hydraulic valve assembly (1), comprising:
a monolithic valve body (5) formed of a single piece, the body having a top face (7) and a bottom face (9) and four sides (11, 13, 15, 17) extending between the top and bottom faces (7, 9), the four sides defining a front side (11), a left side (13), a rear side (15), and a right side (17);
plural valve bores (21, 23, 25) extending between the front side and the rear side of the valve body;
a hydraulic supply inlet (27) and a discharge tank outlet (29) located on the left and right sides of the valve body and in fluid communication with the valve bores (21, 23, 25);
plural work port pairs (31, 32; 33, 34; 35, 36), each work port pair having an opening at the top face and extending to a different one of the valve bores, each work port pair comprising a first work port (31, 33, 35) and a second work port (32, 34, 36);
plural pilot port pairs (41, 42; 43, 44; 45, 46), all pilot port pairs located on the front side, each pilot port pair having an opening at the front side and extending to ends of a different one of the valve bores;
plural control spools (51, 52, 53), one of the control spools in each of the valve bores, each control spool being moveable to control flow of hydraulic fluid between each work port and the inlet and the outlet, wherein,
there are three valve bores, three work port pairs, three pilot port pairs, and three control spools that define three separately operable valves (81, 82, 83),
one of the control spools being a lift spool (53),
the two other control spools being a tilt spool (52) and an auxiliary spool (51),
a positioner spring (71, 72; 73, 74; 75, 76) located at each end of all of the three control spools; and
a single port lock spool (61) located in fluid flow intermediate the openings of the first work ports (31, 33, 35) and the valve bores, the port lock spool being moveable and operatively connected to operate as an ON-OFF valve to lock at least two of the first work ports at the same time, wherein, with the first work ports locked close, fluid flow is prevented to the corresponding valve bores.

2. The assembly of claim 1, further comprising:
a port lock bore (22) within the monolithic valve body (5), the port lock bore being transverse and located over the plural valve bores;
the port lock spool (61) movably located within the port lock bore to operate as an ON-OFF valve;
a positioning spring (68) engaged at a first end of the port lock spool;
a solenoid valve (66) at a second end of the port lock spool; and
a pilot pressure port (67) connected to the solenoid valve (67),
wherein i) in a resting position of the port lock spool, with the solenoid valve (66) non-actuated, the first work ports (33, 35) to the lift spool (53) and to the tilt spool (52) are both closed and the first work port (31) port to the auxiliary spool (51) is open, and ii) in an actuated position of the port lock spool, with the solenoid valve (66) actuated, the solenoid valve opens to expose external pilot pressure via the pilot pressure port to push the spool into a position with all three first work ports opened (31, 33, 35), allowing fluid flow from the first work ports to the corresponding valve bores.

3. The assembly of claim 1,
wherein the port lock spool is moveable and operatively connected to operate as the ON-OFF valve to lock all three of the first work ports at the same time, wherein, with the first work ports locked close, fluid flow is prevented to the corresponding valve bores.

4. The assembly of claim 3, further comprising:
a port lock bore (22) within the monolithic valve body (5),
the port lock spool (61) movably located within the port lock bore;
a positioning spring (68) engaged at a first end of the port lock spool;
a solenoid valve (66) at a second end of the port lock spool; and
a pilot pressure port (67) connected to the solenoid valve (67),
wherein i) in a resting position of the port lock spool, with the solenoid valve (66) non-actuated, both ends of the port lock spool being connected to a tank discharge outlet (69) and all three of the first work ports (31, 33, 35) are locked close, and ii) in an actuated position of the port lock spool, with the solenoid valve (66) actuated, the solenoid valve opens to expose external pilot pressure via the pilot pressure port to push the spool into a position with all three ports opened, allowing fluid flow from all three of the first work ports (31, 33, 35) to the corresponding valve bores.

5. The assembly of claim 1, further comprising:
a port lock bore (22);
the port lock spool (61) movably located within the port lock bore;
a positioning spring (68) engaged at a first end of the port lock spool;
a solenoid valve (66) at a second end of the port lock spool; and
a pilot pressure port (67) connected to the solenoid valve (67),
wherein i) in a resting position of the port lock spool, with the solenoid valve (66) non-actuated, at least the first work ports (33, 35) to the lift spool (53) and to the tilt spool (52) are both closed, and ii) in an actuated position of the port lock spool, with the solenoid valve (66) actuated, the solenoid valve opens to expose external pilot pressure via the pilot pressure port to push the spool into a position with all three first work ports opened (31, 33, 35), allowing fluid flow from the first work ports to the corresponding valve bores.

6. A hydraulic valve assembly (1) comprising:
a valve body comprised of plural valve bores (21, 23, 25), a hydraulic supply inlet (27) and a discharge tank outlet (29) in fluid communication with the valve bores (21, 23, 25), plural work port pairs, each work port pair having an opening and extending to a different one of the valve bores, each work port pair comprising a first work port (31, 33, 35) and a second work port (32, 34, 36), and plural pilot port pairs (41, 42; 43, 44; 45, 46), each pilot port pair having an opening and extending to ends of a different one of the valve bores;
plural control spools (51, 52, 53), one of the control spools in each of the valve bores, each control spool being moveable to control flow of hydraulic fluid between each work port and the inlet and the outlet, wherein,
there are three valve bores, three work port pairs, three pilot port pairs, and three control spools that define three separately operable valves (81, 82, 83),
one of the control spools being a lift spool (53) and the two other control spools being a tilt spool (52) and an auxiliary spool (51); and
a single port lock spool (61) located in fluid flow intermediate the openings of the first work ports (31, 33, 35) and the valve bores, the port lock spool being moveable and operatively connected to operate as an ON-OFF valve to lock at least two of the first work ports at the same time, wherein, with the first work ports locked close, fluid flow is prevented to the corresponding valve bores.

7. The assembly of claim 6, wherein, the single port lock spool is movable to lock all three of the first work ports at the same time.

8. The assembly of claim 6, further comprising:
a port lock bore (22), the port lock spool (61) movably located within the port lock bore;
a positioning spring (68) engaged at a first end of the port lock spool;
a solenoid valve (66) at a second end of the port lock spool; and
a pilot pressure port (67) connected to the solenoid valve (67),
wherein i) in a resting position of the port lock spool, with the solenoid valve (66) non-actuated, the first work ports (33, 35) to the lift spool (53) and to the tilt spool (52) are both closed and the first work port (31) port to the auxiliary spool (51) is open, and ii) in an actuated position of the port lock spool, with the solenoid valve (66) actuated, the solenoid valve opens to expose external pilot pressure via the pilot pressure port to push the spool into a position with all three first work ports opened (31, 33, 35), allowing fluid flow from the first work ports to the corresponding valve bores.

9. The assembly of claim 6, further comprising:
a port lock bore (22), the port lock spool (61) movably located within the port lock bore;
a positioning spring (68) engaged at a first end of the port lock spool;
a solenoid valve (66) at a second end of the port lock spool; and
a pilot pressure port (67) connected to the solenoid valve (67),
wherein i) in a resting position of the port lock spool, with the solenoid valve (66) non-actuated, both ends of the port lock spool being connected to a tank discharge outlet (69) and all three of the first work ports (31, 33, 35) are locked close, and ii) in an actuated position of the port lock spool, with the solenoid valve (66) actuated, the solenoid valve opens to expose external pilot pressure via the pilot pressure port to push the spool into a position with all three ports opened, allowing fluid flow from all three of the first work ports (31, 33, 35) to the corresponding valve bores.

10. The assembly of claim 6, further comprising:
a port lock bore (22), the port lock spool (61) movably located within the port lock bore;
a first solenoid valve (66) at a first end of the port lock spool;
a second solenoid valve (66) at a second end of the port lock spool; and
a pilot pressure port (67) connected to the solenoid valve (67), wherein, i) in a resting position of the port lock spool, with both the first solenoid valve (66) non-actuated and the second solenoid valve (66) non-actuated, both ends of the port lock spool being connected to a tank discharge outlet (69) and all three of the first work ports (31, 33, 35) are locked close, ii) in a first stage actuated position of the port lock spool, with the first solenoid valve (66) actuated, the solenoid valve opens to expose external pilot pressure via the pilot pressure port to push the spool into a position with only one of the three of the first work ports open and the other two of the three of the first work ports locked close, allowing fluid flow from the one open first work port to the corresponding valve bore, and iii) in a second stage actuated position of the port lock spool, with the second solenoid valve (66) actuated, the solenoid valve opens to expose external pilot pressure via the pilot pressure port to push the spool into a position only with all three of the first work ports opened, allowing fluid flow from all three of the first work ports (31, 33, 35) to the corresponding valve bores.

11. A hydraulic valve assembly (1) comprising:

a monolithic valve body (5) formed of a single piece, the body having
- i) a top face (7) and a bottom face (9) and four sides (11, 13, 15, 17) extending between the top and bottom faces (7, 9), the four sides defining a front side (11), a left side (13), a rear side (15), and a right side (17),
- ii) three valve bores (21, 23, 25) extending between the front side and the rear side of the valve body,
- iii) a port lock bore (22) transverse to and located over the three valve bores;
- iv) a hydraulic supply inlet (27) and a discharge tank outlet (29) located on the left and right sides of the valve body and in fluid communication with the valve bores (21, 23, 25),
- v) three work port pairs (31, 32; 33, 34; 35, 36), each work port pair having an opening at the top face and extending to a different one of the valve bores, each work port pair comprising a first work port (31, 33, 35) and a second work port (32, 34, 36), and
- vi) three pilot port pairs (41, 42; 43, 44; 45, 46), all of the pilot port pairs having an opening at the front side and extending to ends of a different one of the valve bores;

three control spools (51, 52, 53), one of the control spools in each of the valve bores, each control spool being moveable to control flow of hydraulic fluid between each work port and the inlet and the outlet, one of the control spools being a lift spool (53), the two other control spools being a tilt spool (52) and an auxiliary spool (51);

a positioner spring (71, 72; 73, 74; 75, 76) located at each end of all of the three control spools; and a port lock spool (61) movably located within the port lock bore;

a positioning spring (68) engaged at a first end of the port lock spool;

a solenoid valve (66) at a second end of the port lock spool; and a pilot pressure port (67) connected to the solenoid valve (67), wherein i) in a resting position of the port lock spool, with the solenoid valve (66) non-actuated, at least the first work ports (33, 35) to the lift spool (53) and to the tilt spool (52) are both closed, and ii) in an actuated position of the port lock spool, with the solenoid valve (66) actuated, the solenoid valve opens to expose external pilot pressure via the pilot pressure port to push the spool into a position with all three first work ports opened (31, 33, 35), allowing fluid flow from the first work ports to the corresponding valve bores.

12. The assembly of claim 11, wherein, i) in a resting position of the port lock spool, with the solenoid valve (66) non-actuated, the first work ports (33, 35) to the lift spool (53) and to the tilt spool (52) are both closed and the first work port (31) port to the auxiliary spool (51) is open.

13. The assembly of claim 11, wherein, i) in a resting position of the port lock spool, with the solenoid valve (66) non-actuated, all three of the first work ports (33, 35) are locked closed.

* * * * *